(12) United States Patent
Morishita et al.

(10) Patent No.: US 9,296,919 B2
(45) Date of Patent: Mar. 29, 2016

(54) CHROMATE-FREE BLACK-COATED METAL PLATE

(75) Inventors: Atsushi Morishita, Tokyo (JP);
Kimitaka Hayashi, Tokyo (JP);
Masahiro Fuda, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 99 days.

(21) Appl. No.: 13/322,483

(22) PCT Filed: May 26, 2010

(86) PCT No.: PCT/JP2010/059291
§ 371 (c)(1),
(2), (4) Date: Nov. 25, 2011

(87) PCT Pub. No.: WO2010/137726
PCT Pub. Date: Dec. 2, 2010

(65) Prior Publication Data
US 2012/0070651 A1    Mar. 22, 2012

(30) Foreign Application Priority Data

May 27, 2009   (JP) ................................ 2009-127562

(51) Int. Cl.
| B32B 5/16 | (2006.01) |
| B32B 3/00 | (2006.01) |
| C09D 175/04 | (2006.01) |
| C09D 5/08 | (2006.01) |
| C09D 7/12 | (2006.01) |
| C09D 167/00 | (2006.01) |
| B05D 3/10 | (2006.01) |
| B05D 5/06 | (2006.01) |
| B05D 7/14 | (2006.01) |
| C08K 3/04 | (2006.01) |
| C08L 23/06 | (2006.01) |
| C08L 61/28 | (2006.01) |

(52) U.S. Cl.
CPC ............... *C09D 175/04* (2013.01); *C09D 5/08* (2013.01); *C09D 7/125* (2013.01); *C09D 7/1216* (2013.01); *C09D 7/1266* (2013.01); *C09D 7/1275* (2013.01); *C09D 7/1283* (2013.01); *C09D 167/00* (2013.01); *B05D 3/108* (2013.01); *B05D 5/06* (2013.01); *B05D 7/14* (2013.01); *B05D 2601/02* (2013.01); *C08K 3/04* (2013.01); *C08L 23/06* (2013.01); *C08L 61/28* (2013.01); *C08L 2205/18* (2013.01); *Y10T 428/25* (2015.01); *Y10T 428/254* (2015.01); *Y10T 428/259* (2015.01); *Y10T 428/265* (2015.01)

(58) Field of Classification Search
USPC .......................................................... 428/327
See application file for complete search history.

(56) References Cited

U.S. PATENT DOCUMENTS

| 4,340,519 | A | * | 7/1982 | Kotera et al. ................. 523/414 |
| 5,349,010 | A | | 9/1994 | Kuo |
| 5,556,935 | A | | 9/1996 | Traubel et al. |
| 5,633,037 | A | * | 5/1997 | Mayer ........................... 427/140 |
| 6,126,730 | A | * | 10/2000 | Yoshida et al. ............ 106/14.41 |
| 2005/0143531 | A1 | * | 6/2005 | Lee et al. ...................... 525/424 |
| 2006/0093407 | A1 | * | 5/2006 | Toda et al. .................... 399/284 |
| 2006/0177685 | A1 | * | 8/2006 | Matsuda et al. .............. 428/621 |
| 2006/0182948 | A1 | * | 8/2006 | Watase et al. ................ 428/323 |
| 2009/0011274 | A1 | * | 1/2009 | Ogata et al. .................. 428/626 |
| 2010/0098939 | A1 | | 4/2010 | Tada et al. |

FOREIGN PATENT DOCUMENTS

| EP | 1607424 A1 | 12/2005 |
| JP | 62-185227 A | 8/1987 |
| JP | 5-39458 A | 2/1993 |
| JP | 2001-106970 A | 4/2001 |
| JP | 2006-264083 A | 10/2006 |
| JP | 2006-346934 A | 12/2006 |
| JP | 2007-204847 A | 8/2007 |
| JP | 2009-34973 A | 2/2009 |
| WO | WO 2008/078956 A1 | 7/2008 |
| WO | WO 2008/105247 A1 | 9/2008 |

OTHER PUBLICATIONS

International Search Report issued in PCT/JP2010/059291, dated Jul. 6, 2010.
Enoki et al., "Undercoating lacquer with improved surface smoothness etc.—comprises polyester resin contg. alkali metal sulphonate-substd. di:carboxylic acid, solvent and carbon black," Database WPI, Abstract for JP-62-185227, Week 198738, Thomson Scientific, AN 1987-267142, 1987, XP-002684222.
Extended European Search Report for European Application No. 10780680.4, dated Oct. 12, 2012.

* cited by examiner

*Primary Examiner* — Cheng Huang
(74) *Attorney, Agent, or Firm* — Birch, Stewart, Kolasch & Birch, LLP

(57) ABSTRACT

An inexpensive chromate-free black metal sheet not containing the high environmental load hexavalent chromium and extremely excellent in finish (coloring power and concealing power including worked parts), moisture resistance, corrosion resistance, formability, scratch resistance, chemical resistance, etc. The present invention is a chromate-free black-coated metal plate characterized by comprising a metal sheet on at least one surface of which is formed a black coating (α), containing a polyester resin (A1) containing sulfonic acid groups cured by a curing agent (B) and carbon black (C), of a thickness of 2 to 10 μm.

18 Claims, No Drawings

CHROMATE-FREE BLACK-COATED METAL PLATE

TECHNICAL FIELD

The present invention relates to inexpensive chromate-free black-coated metal plate having a black coating ($\alpha$), not containing the high environmental load hexavalent chromium, formed on at least one surface of the metal sheet and having an extremely excellent finish (coloring power and concealing power including worked parts), moisture resistance, corrosion resistance, formability, scratch resistance, chemical resistance, etc.

BACKGROUND ART

In household electrical appliances, building materials, automobiles, etc., instead of the conventional post-coated products which are coated after being formed, pre-coated steel plates coated by pre-colored organic coating films have come to be used. These pre-coated steel plates are comprised of steel sheets treated to prevent rust or plated steel sheets which are then coated by colored organic coating films, so have beauty, yet have formability and are excellent in corrosion resistance.

For example, PLT 1 discloses the art of defining the structure of the coating film so as to obtain a pre-coated steel plate excellent in formability, contamination resistance, and hardness. On the other hand, PLT 2 discloses a pre-coated steel plate using a specific chromate treatment solution so as to improve the corrosion resistance at the end faces. These pre-coated steel plates have as their object to provide good corrosion resistance and also formability and coating adhesion by the composite effect of the plating layer, chromate treated films, and the primer films containing a chromic rust-preventing pigment, to eliminate the coating after forming, and to improve the productivity and quality.

However, considering the environmental load of the hexavalent chromium which may be eluted from the chromate treated films and organic coating films containing chromium-based rust-preventing pigments, recently demand has been growing for non-chromium rust prevention and non-chromium organic coating films. To deal with this, for example, PLT 3 and PLT 4 disclose non-chromium-based pre-coated steel plates excellent in corrosion resistance. These have already been commercialized.

The coatings used for these pre-coated steel plates give thick coatings of 10 µm or more. In addition, since a large amount of solvent-based paint is used, incinerators, facilities for dealing with odors, and other specialized coating facilities are required. Production on specialized coating lines is the general practice. That is, an extra coating step is involved in addition to the steps of production of steel plate for coating, so large expenses are required in addition to the costs of the materials required for the coating. Therefore, the obtained pre-coated steel plates are expensive.

However, due to increasingly diverse user needs, there is a demand for colored steel plates in household electrical appliances, interior building materials, or other fields in which the objective is sufficiently achieved if having durability under routine usage conditions. Lower priced products are being sought. That is, conventional expensive pre-coated steel plates alone are not sufficient for meeting the increasingly diverse demand.

To deal with these needs, as colored steel plates able to be inexpensively produced, for example, PLT 5 discloses a colored steel plate provided with a colored resin layer of a thickness of 5 µm or less, while PLT 6 discloses a colored steel plate having a color forming coating film on the surface of steel having a specific roughness. However, these colored steel plates are designed to secure corrosion resistance by chromate treated coating films, so cannot handle the recent needs for non-chromium use. In addition, these are not designed considering the concealing power at locations which are worked and the colored layers are stretched, so there was also the problem of a remarkable decreasing in the appearance of the worked parts.

CITATION LIST

Patent Literature

PLT 1: Japanese Patent Publication (A) No. 8-168723
PLT 2: Japanese Patent Publication (A) No. 3-100180
PLT 3: Japanese Patent Publication (A) No. 2000-199075
PLT 4: Japanese Patent Publication (A) No. 2000-262967
PLT 5: Japanese Patent Publication (A) No. 5-16292
PLT 6: Japanese Patent Publication (A) No. 2-93093

SUMMARY OF INVENTION

Technical Problem

The present invention, in view of this situation, has as its object to provide an inexpensive chromate-free black-coated metal plate which is extremely excellent in finish (coloring power and concealing power including worked parts), moisture resistance, corrosion resistance, formability, scratch resistance, chemical resistance, etc., even without including the high environmental load hexavalent chromium.

Solution to Problem

To produce an inexpensive black-coated metal plate, it is important that the paint for forming the black coating be a water-based paint and that the finish (coloring power and concealing power including worked parts) and other performance in a thin film state be better than a conventional pre-coated steel plate. Production by a specialized coating facility becomes unnecessary due to the former, so it becomes possible to slash excess coating costs. Slashing material costs required for coating becomes possible by the latter. In addition, if a thin film, it is possible to suppress the occurrence of coating defects called "bubbles" which easily occur when coating the water-based paint in a thin film and possible to secure high productivity manufacture. To secure a good finish with a thin film, it is suitable to form a black coating with a high concealing power by paint containing carbon black. However, carbon black particles have hydrophobic surfaces, so are poor in compatibility with the water of the solvent of the water-based paint and are difficult to uniformly disperse in a water-based paint. That is, securing good dispersability of carbon black in a water-based paint so as to secure a good finish even with a thin film is important. Here, a "water-based paint" means a coating composition in which water is the main ingredient of the solvent and the solvent does not contain an "organic solvent" as defined by the Industrial Safety and Health Law in Japan.

As the method of securing a good dispersability of carbon black in a water-based paint, the method of treating the surfaces of the carbon black particles to make them hydrophilic, the method of adding a surfactant when dispersing the carbon black, etc. may be applied. However, with these methods, moisture resistance and corrosion resistance of the coating formed are reduced, so it is difficult to achieve both a good finish and moisture resistance and corrosion resistance.

Further, a black-coated metal plate is press-formed for use, so it is necessary to secure a good finish even at locations where the black coating is stretched due to being worked and locations which are slid upon by the press dies. It is crucial to design a black coating with an excellent balance in ductility, hardness, and adhesion. In general, a coating which contains carbon black falls in formability of the coating due to the effect of the carbon black. It is difficult to secure the balance of above properties. In addition, design of the black coating considering the moisture resistance, corrosion resistance, formability, scratch resistance, chemical resistance, etc. so as not to enable the finished appearance to be impaired by rust-forming up to the final product or cleaning by chemicals is also important.

The inventors engaged in intensive studies to solve these problems and as a result discovered that by coating a water-based black paint containing a polyester resin (A1) containing sulfonic acid groups, a curing agent (B), and carbon black (C) on at least one surface of a metal sheet and forming a 2 to 10 μm thick black coating (α), an inexpensive chromate-free black-coated metal plate is obtained which is extremely excellent in finish (coloring power and concealing power including worked parts), moisture resistance, corrosion resistance, formability, scratch resistance, chemical resistance, etc. even if not containing the high environmental load hexavalent chromium and thereby completed the present invention.

That is, the present invention has the following as its gist:
(1) A chromate-free black-coated metal plate characterized by comprising a metal sheet on at least one surface of which is formed a black coating (α), comprising a polyester resin (A1) containing sulfonic acid groups cured by a curing agent (B) and carbon black (C), of a thickness of 2 to 10 μm.
(2) A chromate-free black-coated metal plate as set forth in (1), characterized in that said polyester resin (A1) has a hydroxyl value of 2 to 30 mg KOH/g.
(3) A chromate-free black-coated metal plate as set forth in (1) or (2), characterized in that the sulfonic acid groups which are contained in said polyester resin (A1) are metal sulfonate groups neutralized by an alkali metal.
(4) A chromate-free black-coated metal plate as set forth in any one of (1) to (3), characterized in that said polyester resin (A1) has a glass transition temperature of 5 to 50° C.
(5) A chromate-free black-coated metal plate as set forth in any one of (1) to (3), characterized in that said polyester resin (A1) has a glass transition temperature of 5 to 25° C.
(6) A chromate-free black-coated metal plate as set forth in any one of (1) to (5), characterized in that said polyester resin (A1) has a number average molecular weight of 8000 to 25000.
(7) A chromate-free black-coated metal plate as set forth in any one of (1) to (6), characterized in that said polyester resin (A1) contains urethane bonds in its chemical structure.
(8) A chromate-free black-coated metal plate as set forth in any one of (1) to (7), characterized in that said black coating (α) further comprises an acrylic resin (A2).
(9) A chromate-free black-coated metal plate as set forth in any one of (1) to (8), characterized in that said black coating (α) further comprises a polyurethane resin (A3) containing carboxyl groups.
(10) A chromate-free black-coated metal plate as set forth in any one of (1) to (9), characterized in that said polyurethane resin (A3) contains urea groups.
(11) A chromate-free black-coated metal plate as set forth in any one of (1) to (10), characterized in that said curing agent (B) comprises a melamine resin (B1).
(12) A chromate-free black-coated metal plate as set forth in any one of (1) to (11), characterized in that when a content of said carbon black (C) in said black coating (α) is X mass % and a thickness of said black coating (α) is Y μm, X×Y≥20 and X≤15 are satisfied.
(13) A chromate-free black-coated metal plate as set forth in any one of (1) to (12), characterized in that said carbon black (C) is dispersed in said black coating (α) in the form of particles of a number average particle size of 20 to 300 nm.
(14) A chromate-free black-coated metal plate as set forth in any one of (1) to (13), characterized in that said black coating (α) further comprises silica (D).
(15) A chromate-free black-coated metal plate as set forth in (14), characterized in that silica (D) is dispersed in said black coating (α) in the form of particles of a number average particle size of 5 to 50 nm.
(16) A chromate-free black-coated metal plate as set forth in any one of (1) to (15), characterized in that said black coating (α) further comprises a lubricant (E).
(17) A chromate-free black-coated metal plate as set forth in (16), characterized in that said lubricant (E) is comprised of polyethylene resin particles.
(18) A chromate-free black-coated metal plate as set forth in (17), characterized in that said polyethylene resin particles are dispersed in said black coating (α) in the form of particles of a number average particle size of 0.5 to 2 μm.
(19) A chromate-free black-coated metal plate as set forth in any one of (1) to (18), characterized in that a subbing layer (β) is disposed under said black coating (α).
(20) A chromate-free black-coated metal plate as set forth in any one of (1) to (19), characterized in that said black coating (α) is formed by coating a water-based black paint containing a polyester resin (A1) containing sulfonic acid groups, a curing agent (B), and carbon black (C) on a metal sheet, and heating the coated metal sheet to dry.

Advantageous Effects of Invention

The chromate-free black-coated metal plate of the present invention does not include the high environmental load hexavalent chromium, is inexpensive, and is extremely excellent in finish (coloring power and concealing power including worked parts), moisture resistance, corrosion resistance, formability, scratch resistance, chemical resistance, etc. For this reason, this is extremely promising as an inexpensive, excellent finish, high added value environmentally friendly material and contributes a lot to various industrial fields.

DESCRIPTION OF EMBODIMENTS

Below, details of the present invention and reasons for using the ingredients according to the invention will be explained.

The black coating (α) of the chromate-free black metal plate of the present invention includes the polyester resin (A1) containing sulfonic acid groups, curing agent (B), and carbon black (C) and is formed by coating a water-based black paint not containing chromium on at least one surface of a metal sheet and drying it by baking. The polyester resin itself is hydrophobic, but the sulfonic acid groups contained in the resin exhibit a high hydrophilicity, so the polyester resin (A1) containing sulfonic acid groups can be stably dissolved or dispersed in water.

In addition, the polyester resin (A1) containing sulfonic acid groups performs the important role of improving the compatibility between the carbon black (C), which has hydrophobic surfaces, and water and making the carbon black (C) be uniformly stably dispersed in the paint. This is due to the effect obtained by the main structure of the polyester resin exhibiting hydrophobicity being oriented to the carbon black (C). By having the polyester resin (A1) stably dissolve or disperse in water, the carbon black (C) similarly can be uniformly dispersed. To realize this superior dispersability, inclusion of sulfonic acid groups exhibiting extremely high hydrophilicity in the hydrophobic polyester resin is an essential requirement.

In this way, a black coating (α) formed from a water-based paint in which a polyester resin (A1) containing sulfonic acid groups enables the carbon black (C) to be uniformly stably dispersed contains the carbon black (C) uniformly dispersed even in the coating, and can exhibit an extremely excellent finish (coloring power and concealing power) even in a thin film. Further, a water-based paint in which a polyester resin (A1) containing sulfonic acid groups enables carbon black (C) to be uniformly stably dispersed eliminates the need for treatment to make the surface hydrophilic or addition of a surfactant for raising the dispersability of carbon black (C), so there is no fear of the black coating (α) which is formed falling in moisture resistance or corrosion resistance.

That is, by using a polyester resin (A1) containing sulfonic acid groups, the role as a binder ingredient of the black coating (α) and the role of increasing the dispersability of the carbon black (C) can be simultaneously obtained, so a balance between excellent finish and moisture resistance and corrosion resistance can be obtained.

To secure a good balance of the moisture resistance, corrosion resistance, formability, scratch resistance, chemical resistance, and other properties of the black coating (α), a coating based on a polyester resin cured by baking by a curing agent (B) is suitable. That is, by curing a polyester resin, which is high in ductility and excellent in formability, by a curing agent (B), it is possible to obtain a black coating (α) provided with moisture resistance, corrosion resistance, scratch resistance, and chemical resistance. A decreasing in the film-formability due to the addition of carbon black (C) can be made up for by curing by baking by the curing agent (B). It is possible to obtain a dense black coating (α) which is excellent in balance of ductility and hardness. In addition, the sulfonic acid groups contained in the polyester resin (A1) have the effect of improving the adhesion with the substrate metal sheet (in the case of subbing treatment, the subbing layer), so the obtained black coating (α) is extremely excellent in adhesion with the substrate or subbing layer (β).

The black coating (α) formed by coating a water-based black paint containing a polyester resin (A1) containing sulfonic acid groups, a curing agent (B), and carbon black (C) on at least one surface of the metal sheet and then drying it by baking is extremely excellent in finish (coloring power and concealing power including worked parts), moisture resistance, corrosion resistance, formability, scratch resistance, chemical resistance, etc.

The black coating (α) has a coating thickness of 2 to 10 μm. If less than 2 μm, a sufficient finish (coloring power and concealing power) or corrosion resistance cannot be obtained. If over 10 μm, this is economically disadvantageous. Not only this, bubbles or other coating defects sometimes occur. It is not possible to stably obtain the appearance necessary as an industrial product.

The thickness of the black coating (α) may be measured by observation of the cross-section of the coating or utilization of an electromagnetic thickness meter etc. In addition, the mass of the coating deposited per unit area may be calculated by division by the specific gravity of the coating or the specific gravity of the paint after drying. The deposited mass of the coating may be suitably selected from known techniques such as measuring the difference in mass before and after coating, the difference in mass before and after peeling off the coating film after coating, the amounts of elements present with contents in the coating film learned in advance by fluorescent X-ray analysis of the coating, etc. The specific gravity of the coating or the specific gravity of the paint after drying may be suitably selected by a known method such as measurement of the volume and mass of the isolated coating, measurement of the volume and mass after taking a suitable quantity of paint in a container and drying it, calculation from the amounts of the ingredients forming the coating and the known specific gravities of the ingredients.

The type of the polyester resin (A1) is not particularly limited so long as containing sulfonic acid groups, but for example may be obtained by dissolving or dispersing in water the material obtained by condensation polymerization of a polyester material comprised of a polycarboxylic acid ingredient and polyol ingredient.

The polycarboxylic acid ingredient is not particularly limited, but, for example, terephthalic acid, isophthalic acid, orthophthalic acid, 2,6-naphthalenedicarboxylic acid, succinic acid, glutaric acid, adipic acid, sebacic acid, dodecanedicarboxylic acid, azeleic acid, 1,2-cyclohexanedicarboxylic acid, 1,3-cyclohexanedicarboxylic acid, 1,4-cyclohexanedicarboxylic acid, dimer acid, anhydrous trimellitic acid, anhydrous pyromellitic acid etc. may be mentioned. These may be used alone or in combinations of any two or more types.

The polyol ingredient is not particularly limited, but for example ethyleneglycol, diethyleneglycol, 1,3-propanediol, 1,2-propanediol, triethyleneglycol, 2-methyl-1,3-propanediol, 2,2-dimethyl-1,3-propanediol, 2-butyl-2-ethyl 1,3-propanediol, 1,4-butanediol, 2-methyl-1,4-butanediol, 2-methyl-3-methyl-1,4-butanediol, 1,5-pentanediol, 3-methyl-1,5-pentanediol, 1,6-hexanediol, 1,4-cyclohexanedimethanol, 1,3-cyclohexanedimethanol, 1,2-cyclohexanedimethanol, hydrated bisphenol-A, dimer diol, trimethylolethane, trimethylolpropane, glycerin, pentaerythritol, etc. may be mentioned. These may be used alone or in combinations of any two or more types.

The method of introducing the sulfonic acid groups is not particularly limited, but, for example, the method of using 5-sulfoisophthalic acid, 4-sulfonaphthalene-2,7-dicarboxylic acid, 5(4-sulfophenoxy)isophthalic acid, or other dicarboxylic acids or 2-sulfo-1,4-butanediol, 2,5-dimethyl-3-sulfo-2,5-hexyldiol, or other glycols as polyester materials may be mentioned.

The amount of use of the dicarboxylic acid containing sulfonic acid groups or glycol is preferably 0.1 to 10 mol % with respect to the total polycarboxylic acid ingredients or total polyol ingredients. If less than 0.1 mol %, sometimes the solubility or dispersability in water falls or sometimes the finish of the black coating (α) as a thin film (coloring power and concealing power) cannot be obtained. If over 10 mol %, the moisture resistance or corrosion resistance sometimes falls. From the viewpoint of the balance between the finish as a thin film (coloring power and concealing power) and the moisture resistance and corrosion resistance, it is more preferably 0.5 to 5 mol % in range.

The sulfonic acid groups contained in the polyester resin (A1) indicates functional groups expressed by $-SO_3H$. These may also be neutralized by alkali metals, amines including ammonia, etc. When neutralized, it is also possible to incorporate already neutralized sulfonic acid groups in the resin and also possible to introduce sulfonic acid groups into the resin, then neutralizing it. In particular, metal sulfonate groups neutralized by Li, Na, K, and other alkali metals exhibit higher hydrophilicity, so are preferable in increasing the dispersability of carbon black (C) and obtaining a high finish. Further, in improving the adhesion of the black coating (α) with the substrate as well, the sulfonic acid groups are more preferably metal sulfonate groups neutralized by an alkali metal, most preferably Na sulfonate groups.

The polyester resin (A1) has a hydroxyl value of preferably 2 to 30 mg KOH/g. If less than 2 mg KOH/g, the curing by baking with the curing agent (B) becomes insufficient and the moisture resistance, corrosion resistance, scratch resistance, or chemical resistance sometimes falls. If over 30 mg KOH/g, the curing by baking becomes excessive and the corrosion resistance or formability sometimes falls. The hydroxyl value can be measured by the method of dissolving the polyester resin in a solvent, reacting it with anhydrous acetic acid, then reversely titrating the excessive anhydrous acetic acid by potassium hydroxide.

The polyester resin (A1) has a glass transition temperature of preferably 5 to 50° C. From both the viewpoints of chemical resistance and formability, 5 to 25° C. is particularly preferable. If less than 5° C., the scratch resistance or chemical resistance sometimes falls. If over 50° C., the formability sometimes falls. The glass transition temperature can be measured by measurement by a differential scan calorimeter.

The polyester resin (A1) has a number average molecular weight of preferably 8000 to 25000. If less than 8000, the formability or chemical resistance sometimes falls. If over 25000, the paint storage stability sometimes falls (paint solidifies along with elapse of time and sediment forms). The number average molecular weight can be measured by gel permeation chromatography as a value converted to polystyrene.

Inclusion of urethane bonds in the polyester resin (A1) chemical structure is preferable. By including urethane bonds, it is possible to improve the adhesion of the black coating (α) with the substrate, the moisture resistance, and the corrosion resistance. As the method for introducing urethane bonds into the black coating (α), as explained later, the method of including a polyurethane resin in the black coating (α), but sometimes different resins are blended and sometimes, if the compatibility of these resins is poor, conversely the adhesion or the corrosion resistance falls. If introducing urethane bonds by the technique of including urethane bonds in the polyester resin (A1) chemical structure, there is also the advantage that the above such problems do not easily occur. The method of introduction of urethane bonds into the polyester resin (A1) chemical structure is not particularly limited, but for example, these may be obtained by reaction of the hydroxyl groups contained in the polyester resin with hexamethylene diisocyanate, isophoron diisocyanate, tolylene diisocyanate, or other diisocyanate compounds.

The black coating (α) preferably further comprises an acrylic resin (A2). By further including the acrylic resin (A2), it is possible to further raise the dispersability of the carbon black (C) in the water-based black paint for forming the black coating (α) and possible to further raise the finish at the thin film (coloring power and concealing power). The type of the acrylic resin (A2) is not particularly limited, but a resin obtained by a free-radical polymerization of styrene, alkyl (meth)acrylates, (meth)acrylic acid, hydroxyalkyl(meth)acrylates, alkoxysilane(meth)acrylates, or other unsaturated monomers in an aqueous solution using a polymerization initiator may be mentioned. The polymerization initiator is not particularly limited. For example, potassium permanganate, ammonium persulfate, or other persulfate, azobis cyanovaleric acid, azobis isobutyronitrile, or other azo compound etc. may be used.

The content of the acrylic resin (A2) is preferably 0.5 to 10 mass % with respect to the polyester resin (A1) as 100 mass %. If less than 0.5 mass %, sometimes the finish (coloring power or concealing power) falls, while if over 10 mass %, sometimes the corrosion resistance or formability falls.

The black coating (α) preferably further comprises a polyurethane resin (A3) containing carboxyl groups. By further including a polyurethane resin (A3) containing carboxyl groups, it is possible to improve adhesion of the black coating (α) with the substrate, moisture resistance, and corrosion resistance. The type of the polyurethane resin (A3) is not particularly limited so long as containing carboxyl groups, but for example a resin obtained by reaction with ethyleneglycol, propyleneglycol, diethyleneglycol, 1,6-hexanediol, neopentylglycol, triethyleneglycol, bisphenol hydroxypropyl ether, glycerin, trimethylolethane, trimethylolpropane, and other polyhydric alcohols, hexamethylene diisocyanate, isophoron diisocyanate, tolylene diisocyanate, or other diisocyanate compound, chain extending by a diamine etc., and aqueous dispersion may be mentioned. Chain elongation by a diamine raises the molecular weight of the resin and further generates urea groups from a reaction between isocyanate groups and amino groups. By including the high cohesive energy urea groups in the resin, it is possible to further raise the cohesive force of the coating and further raise the corrosion resistance and scratch resistance.

The content of the polyurethane resin (A3) is preferably 5 to 100 mass % with respect to the polyester resin (A1) as 100 mass %. If less than 5 mass %, sometimes the adhesion with the substrate or the corrosion resistance falls, while if over 100 mass %, sometimes the formability falls.

The curing agent (B) is not particularly limited so long as curing the polyester resin (A), but, for example, a melamine resin or polyisocyanate compound may be mentioned. The melamine resin is a resin comprised of a product obtained by condensation of melamine and formaldehyde in which part or all of the methylol groups are etherified by methanol, ethanol, butanol, or other lower alcohol. The polyisocyanate compound is not particularly limited. For example, hexamethylene diisocyanate, isophoron diisocyanate, xylylene diisocyanate, tolylene diisocyanate, etc. may be mentioned. Further, this blocked product may be a blocked product of a polyisocyanate compound such as a blocked product of hexaxylene diisocyanate, a blocked product of isophoron diisocyanate, a blocked product of xylylene diisocyanate, a blocked product of tolylene diisocyanate, etc. may be mentioned. These curing agents may be used alone or may be used jointly in two or more types.

The content of the curing agent (B) is preferably 5 to 35 mass % with respect to the total organic resin (A) (when the black coating (α) includes an organic resin other than the polyester resin (A1), the total organic resin including also that organic resin is indicated) as 100 mass %. If less than 5 mass %, sometimes the curing by baking is insufficient and the moisture resistance, corrosion resistance, scratch resistance, or chemical resistance falls. If over 35 mass %, sometimes the curing by baking become excessive and the corrosion resistance or formability falls.

From the viewpoints of the scratch resistance and chemical resistance, the curing agent (B) preferably comprises a melamine resin. The content of the melamine resin is preferably 30 to 100 mass % in the curing agent (B). If less than 30 mass %, sometimes the scratch resistance or the chemical resistance falls.

The black coating (α) more preferably comprises silica (D). If including silica (D), the corrosion resistance and the scratch resistance are improved. The silica (D) is not particularly limited, but is preferably colloidal silica of a primary particle size of 5 to 50 nm, fumed silica, or other silica particles. As commercially available products, for example, Snowtex O, Snowtex N, Snowtex C, and Snowtex IPA-ST (made by Nissan Chemical), Adelite AT-20N and AT-20A (made by Asahi Denka), Aerosil 200 (Nippon Aerosil) etc. may be mentioned. These silica particles are preferably dispersed in the black coating (α) as well in their primary particle size (number average particle size) of 5 to 50 nm from the viewpoint of the corrosion resistance or the formability.

The content of the silica (D) is preferably 5 to 30 mass % in the black coating (α). If less than 5 mass %, sometimes the corrosion resistance or the scratch resistance falls. If over 30 mass %, sometimes the moisture resistance, corrosion resistance, or formability falls.

The black coating (α) preferably further comprises a lubricant (E). By including a lubricant (E), the scratch resistance is improved. The lubricant (E) is not particularly limited. A known lubricant may be used, but at least one type selected from fluorine resin-based resins and polyolefin resin-based resins is preferably used. As the fluorine resin based resin, polytetrafluoroethylene (PTFE), tetrafluoroethylene-hexafluoropropylene copolymer (FEP), tetrafluoroethylene-perfluoroalkyl vinylether copolymer (PFA), polychlorotrifluoroethylene (PCTFE), polyvinylidene fluoride (PVDF), polyvinyl fluoride (PVF), ethylene-tetrafluoroethylene copolymer (ETFE), ethylene-chlorotrifluoroethylene copolymer (ECTFE), etc. may be used. Among these, one type may be used alone or two or more types may be used together.

The polyolefin resin-based resin is not particularly limited. Paraffin, microcrystalline wax, polyethylene, or other hydrocarbon-based wax and derivatives of these etc. may be mentioned, but a polyethylene resin is preferable. The derivatives are not particularly limited, but, for example, carboxylated polyolefin, chlorinated polyolefin, etc. may be mentioned. One of these may be used alone or two or more may be used together. In the case of use of the polyethylene resin, dispersion of particles of a number average particle size of 0.5 to 2 μm in the black coating (α) is preferable from the viewpoints of the corrosion resistance or scratch resistance.

The content of the lubricant (E) is preferably 0.5 to 10 mass % in the black coating (α). If less than 0.5 mass %, sometimes the scratch resistance falls. If over 10 mass %, sometimes the corrosion resistance or the formability falls.

The carbon black (C) is not particularly limited, but, for example, furnace black, ketjen black, acetylene black, channel black, and other known carbon black may be used. Further, carbon black treated by known ozone treatment, plasma treatment, and liquid phase oxidation may be used. The carbon black used is not particularly limited in particle size so long as in a range not a problem in dispersion in the paint, quality of the coating, and coatability. Specifically, carbon black having a primary particle size of 10 to 120 nm can be used. If considering the finish (coloring power and concealing power) in the thin film state and the corrosion resistance, it is preferable to use particulate carbon black with a primary particle size of 10 to 50 nm. These carbon blacks aggregate in the process of dispersion in the paints, so dispersion in the primary particle size as is generally is difficult. That is, in actuality, the carbon black is present in the paint in the form of secondary particles having a particle size larger than the primary particle size and is present in a similar form in the black coating (α) formed from the paint. To secure the finish (coloring power and concealing power) in the state of a thin film and the corrosion resistance, the particle size of the carbon black (C) which is dispersed in the coating is important. The number average particle size is preferably 20 to 300 nm.

When making the content of the carbon black (C) in the black coating (α) X mass % and making the thickness of the black coating (α) Y μm, X×Y≥20 and X≤15 are preferably satisfied. To secure the finish (coloring power and concealing power), it is crucial to make the absolute amount of the carbon black contained in the black coating (α) a certain amount or more. The absolute amount of the carbon black can be expressed by the product of the content of the carbon black contained in the coating (X mass %) and the coating thickness (Y μm). That is, if X×Y is less than 20, sometimes the finish (coloring power or concealing power) falls. Further, if X is over 15, sometimes the film-formability of the coating falls and the corrosion resistance or formability falls.

The black coating (α) of the chromate-free black-coated metal plate of the present invention is formed by coating a water-based black paint comprising a polyester resin (A1) containing sulfonic acid groups, a curing agent (B), and carbon black (C) on at least one surface of a metal sheet and drying it by baking. The method of coating the water-based black paint is not particularly limited, but known roll coating, spray coating, bar coating, dipping, electrostatic coating, etc. may be suitable applied.

The method of production of the water-based black paint is not particularly limited, but, for example, the method of adding the ingredients forming the black coating (α) in water, stirring them by a disperser, and dissolving or dispersing them may be mentioned. To improve the solubility or dispersability of the ingredients forming the black coating (α), it is possible to add a known hydrophilic solvent etc. in accordance with need.

The method for drying by baking is not particularly limited. It is possible to heat the metal sheet in advance, heat the metal sheet after coating, and combine these for drying. The heating method is not particularly limited, but hot air, induction heating, near infrared rays, direct heating, etc. can be used alone or in combination. Regarding the temperature for drying by baking, a peak temperature of 150° C. to 250° C. is preferable, 160° C. to 230° C. is more preferable, and 180° C. to 220° C. is most preferable. If the peak temperature is less than 150° C., the curing by baking is insufficient, and the moisture resistance, corrosion resistance, scratch resistance, or chemical resistance sometimes falls, while if over 250° C., sometimes the curing by baking becomes excessive and the corrosion resistance or formability falls. The time for drying by baking is preferably 1 to 60 seconds, particularly preferably 3 to 20 seconds. If less than 1 second, the curing by baking is insufficient, and the moisture resistance, corrosion resistance, scratch resistance, or chemical resistance sometimes falls, while if over 60 second, sometimes the productivity falls.

There is preferably a subbing layer (β) under the black coating (α). The subbing layer (β) is not particularly limited, but by providing a subbing layer (β) comprising at least one compound selected from a silane coupling agent, organic resin, and polyphenol compound, it is possible to further raise the adhesion with the base metal sheet and further raise the corrosion resistance. Further, by providing a subbing layer (β) comprising all of a silane coupling agent, organic resin, and polyphenol compound, it is possible to raise the adhesion with the base metal sheet the most and raise the corrosion resistance the most.

The silane coupling agent which is comprised in the subbing layer (β) is not particularly limited. For example, agents sold from Shin-Etsu Chemical, Nippon Unicar, Chisso, Toshiba Silicone, etc. such as vinyl trimethoxysilane, vinyl triethoxysilane, γ-aminopropyl trimethoxysilane, γ-aminopropyl ethoxysilane, N-[2-(vinylbenzylamino)ethyl]-3-aminopropyl trimethoxysilane, γ-methacryloxypropylmethyl dimethoxysilane, γ-methacryloxypropyl trimethoxysilane, γ-methacryloxypropylmethyl diethoxysilane, γ-methacryloxypropyl triethoxysilane, γ-glycidoxypropyl triethoxysilane, γ-glycidoxypropylmethyl diethoxysilane, γ-glycidoxypropyl trimethoxysilane, 2-(3,4-epoxycyclohexyl)ethyl trimethoxysilane, N-β(aminoethyl)γ-aminopropyl trimethoxysilane, N-β-(aminoethyl)-γ-aminopropyl triethoxysilane, N-β-(aminoethyl)-γ-aminopropylmethyl dimethoxysilane, N-phenyl-γ-aminopropyl trimethoxysilane, γ-mercaptopropyl trimethoxysilane, etc. may be mentioned. The silane coupling agent may be used alone or may be used jointly as two or more types.

The organic resin which is comprised in the subbing layer (β) is not particularly limited. For example, a polyester resin, polyurethane resin, epoxy resin, phenol resin, acrylic resin, polyolefin resin, or other known organic resin may be used. To further raise the adhesion with the base metal sheet, use of at least one of a polyester resin, polyurethane resin, epoxy resin, and phenol resin is preferable. In the sense of raise compatibility with the polyester resin (A1) comprised in the black coating (α) and increasing the adhesion, the subbing layer (β) particularly preferably comprises polyester resin.

The polyphenol compound which is comprised in the subbing layer (β) indicates a compound having two or more phenolic hydroxyl groups bonded to a benzene ring or its condensate. As the compound having two or more phenolic hydroxyl groups bonded to a benzene ring, for example, gallic acid, pyrogallol, catechol, etc. may be mentioned. The condensate of a compound having two or more phenolic hydroxyl groups bonded to a benzene ring is not particularly limited. For example, polyphenol compounds which are widely distributed in the plant kingdom usually called "tannic acid" may be mentioned.

Tannic acid is a general term for aromatic compounds of complicated structures having a large number of phenolic hydroxyl groups widely distributed in the plant kingdom. The tannic acid may be hydrolysable tannic acid or condensed tannic acid. The tannic acid is not particularly limited. For example, hamameli tannin, persimmon tannin, tea tannin, sumac tannin, gallnut tannin, myrobarans tannin, divi-divi pod tannin, algarovilla tannin, valonia tannin, catechin tannin, etc. may be mentioned. As the tannic acid, commercially available ones, for example, "Tannic Acid Extract A", "B Tannic Acid", "N Tannic Acid", "Industrial Tannic Acid", "Purified Tannic Acid", "High Tannic Acid", "F Tannic Acid", "Local Tannic Acid" (all made by Dainippon Pharmaceutical), "Tannic Acid AL" (made by Fuji Chemical Industry), etc. may be used.

The polyphenol compound may be used in single types or may be jointly used in two or more types.

The at least one type of content selected from a silane coupling agent, organic resin, or polyphenol compound which is comprised in the subbing layer (β) is not particularly limited, but preferably 10 mass % or more is contained in the subbing layer as 100 mass %. If less than 10 mass %, the content is insufficient and sometimes the effect of improvement of the adhesion or the corrosion resistance cannot be obtained.

The amount of deposition of the subbing layer (β) is not particularly limited, but 10 to 1000 mg/m$^2$ in range is preferable. If less than 10 mg/m$^2$, a sufficient effect of the subbing layer (β) cannot be obtained. If over 1000 mg/m$^2$, sometimes the subbing layer (β) easily suffers from cohesive failure and the adhesion falls. From the stable effect and economy, the more preferable range of deposition is 50 to 500 mg/m$^2$.

The method of formation of the subbing layer (β) is not particularly limited, but the coating agent for forming a subbing layer (β) is formed by coating at least one surface of the metal sheet and drying it by heating. The method of coating the coating agent is not particularly limited, but known roll coating, spray coating, bar coating, dipping, electrostatic coating, etc. may be suitably used. The method of drying by baking is not particularly limited. The metal sheet may be heated in advance, the metal sheet may be heated after coating, or these may be combined for drying. The heating method is not particularly limited. Hot air, induction heating, near infrared rays, direct heating, etc. may be used alone or in combination. The temperature of drying by baking is preferably a peak temperature of 60° C. to 150° C., particularly preferably 70° C. to 130° C. If the peak temperature is less than 60° C., sometimes the drying is insufficient and the adhesion with the substrate or the corrosion resistance falls. If over 150° C., sometimes the adhesion with the substrate falls.

The metal sheet which can be applied in the present invention is not particularly limited. For example, iron, an iron-based alloy, aluminum, aluminum-based alloy, copper, copper-based alloy, etc. may be mentioned. Any plated metal sheet comprised of a metal sheet which is plated may be used. Among these, the most suitable ones in application of the present invention are zinc-based plated steel sheet and aluminum-based plated steel sheet.

As the zinc-based plated steel sheet, a zinc plated steel sheet, zinc-nickel plated steel sheet, zinc-iron plated steel sheet, zinc-chromium plated steel sheet, zinc-aluminum plated steel sheet, zinc-titanium plated steel sheet, zinc-magnesium plated steel sheet, zinc-manganese plated steel sheet, zinc-aluminum-magnesium plated steel sheet, zinc-aluminum-magnesium-silicon plated steel sheet, or other zinc-based plated steel sheet are included. In addition, these plated layers in which small amounts of different types of metal elements or impurities of cobalt, molybdenum, tungsten, nickel, titanium, chromium, aluminum, manganese, iron, magnesium, lead, bismuth, antimony, tin, copper, cadmium, arsenic, etc. are contained and in which silica, alumina, titania, or other inorganic material is dispersed, are included.

As the aluminum-based plated steel sheet, aluminum or an alloy comprised of aluminum and at least one of silicon, zinc, and magnesium, for example, an aluminum-silicon plated steel sheet, aluminum-zinc plated steel sheet, aluminum-silicon-magnesium plated steel sheet, etc. may be mentioned.

Further, the invention can also be applied to a multilayer plating combining the above plating and other types of plating, for example, iron plating, iron-phosphorus plating, nickel plating, cobalt plating, etc. The plating method is not particularly limited, but known electroplating, hot dip coating, deposition plating, diffusion coating, vacuum plating, or other methods are also possible.

EXAMPLES

Below, examples of the present invention will be explained. However, the present invention is not limited to these examples.

(1) Metal Sheet

The types of the metal sheets used are shown in Table 1. For the substrate of the plated metal sheets, a 0.5 mm thick soft steel sheet was used. For the SUS sheet, a ferritic stainless steel sheet (steel ingredients: C: 0.008 mass %, Si: 0.07 mass %, Mn: 0.15 mass %, P: 0.011 mass %, S: 0.009 mass %, Al: 0.067 mass %, Cr: 17.3 mass %, Mo: 1.51 mass %, N: 0.0051 mass %, Ti: 0.22 mass %, and a balance of Fe and unavoidable impurities) was used. The metal sheet used was one degreased on the surface by an alkali and was rinsed and dried.

TABLE 1

| Metal sheet No. | (sheet thickness 0.5 mm, two-sided plating) |
|---|---|
| A1 | Electrogalvanized steel sheet (plating deposition 20 g/m$^2$) |
| A2 | Hot dip galvanized steel sheet (plating deposition 60 g/m$^2$) |
| A3 | Hot dip galvannealed steel sheet (Fe: 10%, plating deposition 45 g/m$^2$) |
| A4 | Electro Zn—10% Ni alloy plated steel sheet (plating deposition 20 g/m$^2$) |
| A5 | Hot dip Zn—11% Al—3% Mg—0.2% Si plated steel sheet (plating deposition 60 g/m$^2$) |
| A6 | Hot dip Zn—55% Al—1.6% Si plated steel sheet (plating deposition 75 g/m$^2$) |
| A7 | Hot dip Al—9% Si plated steel sheet (plating deposition 40 g/m$^2$) |

(2) Subbing Layer

Coating agents for forming the subbing layers were prepared by mixing the organic resins (Table 2), silane coupling agents (Table 3), and polyphenol compounds (Table 4) by the formulations shown in Table 5 and stirring using a paint-use disperser. The surfaces of the metal sheets prepared in the above (1) were coated with the coating agents by a roll coater to give a 100 mg/m$^2$ deposition amount, then were dried under conditions of a peak sheet temperature of 70° C. so as to form a subbing layer when necessary.

TABLE 2

| No. | Organic resin |
|---|---|
| B1 | Water-based polyester resin (made by Toyobo, Vylonal MD-1200) |
| B2 | Water-based epoxy resin (made by Asahi Denka Yogyo, Adeka Resin EM0436FS-12) |
| B3 | Water-based phenol resin (made by Sumitomo Bakelite, PR-NPK-261) |
| B4 | Water-based acrylic resin (made by NSC Japan, Nevinol KD-5) |

TABLE 3

| No. | Silane coupling agent |
|---|---|
| C1 | 3-glycidoxypropyl trimethoxysilane |
| C2 | 3-aminopropyl triethoxysilane |

TABLE 4

| No. | Polyphenol compound |
|---|---|
| D1 | Tannic acid (made by Fuji Chemical Industry, Tannic Acid AL) |

TABLE 5

| No. | Organic resin Type | Am't (%) | Silane coupling agent Type | Am't (%) | Polyphenol compound Type | Am't (%) | Other ingredients Type | Am't (%) |
|---|---|---|---|---|---|---|---|---|
| E1 | B1 | 100 | | | | | | |
| E2 | | | C1 | 100 | | | | |
| E3 | | | | | D1 | 100 | | |
| E4 | B1 | 40 | C1 | 30 | D1 | 30 | | |
| E5 | B2 | 40 | C1 | 30 | D1 | 30 | | |
| E6 | B3 | 40 | C1 | 30 | D1 | 30 | | |
| E7 | B4 | 40 | C1 | 30 | D1 | 30 | | |
| E8 | B1 | 40 | C2 | 30 | D1 | 30 | | |
| E9 | B1 | 30 | C1 | 25 | D1 | 25 | *Silica | 20 |

*Silica: Snowtex N (made by Nissan Chemical)

(3) Black Coating

Black paints for forming black coatings were prepared by mixing organic resins (Table 6), curing agents (Table 7), carbon blacks (Table 8), silicas (Table 9), and lubricants (Table 10) by the formulations shown in Table 11 and stirring using a paint-use disperser. The top layers on the subbing layers formed in (2) (if no subbing layers, the metal sheets) were coated by roll coaters with the black paints to give predetermined film thicknesses, then the paints were heated to dry at predetermined peak sheet baking temperatures to form black coatings. The particle sizes of the carbon black, silica, and lubricant in the black coatings were determined by observing the cross-sections of the coatings by a TEM (Transmission Electron Microscope), measuring the particle sizes at any 20 locations, and finding the averages.

TABLE 6

| No. | Organic Resin |
|---|---|
| F1 | Na sulfonate group-containing polyester resin (hydroxyl value: 10 mg KOH/g, Tg: 15° C., molecular weight: 15000) |
| F2 | Na sulfonate group-containing polyester resin (hydroxyl value: 1 mg KOH/g, Tg: 15° C., molecular weight: 15000) |
| F3 | Na sulfonate group-containing polyester resin (hydroxyl value: 2 mg KOH/g, Tg: 15° C., molecular weight: 15000) |
| F4 | Na sulfonate group-containing polyester resin (hydroxyl value: 20 mg KOH/g, Tg: 15° C., molecular weight: 15000) |
| F5 | Na sulfonate group-containing polyester resin (hydroxyl value: 25 mg KOH/g, Tg: 15° C., molecular weight: 15000) |
| F6 | Na sulfonate group-containing polyester resin (hydroxyl value: 10 mg KOH/g, Tg: 0° C., molecular weight: 15000) |
| F7 | Na sulfonate group-containing polyester resin (hydroxyl value: 10 mg KOH/g, Tg: 5° C., molecular weight: 15000) |
| F8 | Na sulfonate group-containing polyester resin (hydroxyl value: 10 mg KOH/g, Tg: 30° C., molecular weight: 15000) |
| F9 | Na sulfonate group-containing polyester resin (hydroxyl value: 10 mg KOH/g, Tg: 50° C., molecular weight: 15000) |
| F10 | Na sulfonate group-containing polyester resin (hydroxyl value: 10 mg KOH/g, Tg: 60° C., molecular weight: 15000) |
| F11 | Na sulfonate group-containing polyester resin (hydroxyl value: 10 mg KOH/g, Tg: 15° C., molecular weight: 8000) |
| F12 | Na sulfonate group-containing polyester resin (hydroxyl value: 10 mg KOH/g, Tg: 15° C., molecular weight: 10000) |
| F13 | Na sulfonate group-containing polyester resin (hydroxyl value: 10 mg KOH/g, Tg: 15° C., molecular weight: 20000) |
| F14 | Na sulfonate group-containing polyester resin (hydroxyl value: 10 mg KOH/g, Tg: 15° C., molecular weight: 25000) |
| F15 | Na sulfonate group-containing polyester resin (hydroxyl value: 10 mg KOH/g, Tg: 15° C., molecular weight: 27000) |
| F16 | Urethane-modified Na sulfonate group-containing polyester resin (hydroxyl value: 10 mg KOH/g, Tg: 15° C., molecular weight: 15000, urethane bonds contained) |
| F17 | Sulfonic acid group-containing polyester resin (hydroxyl value: 10 mg KOH/g, Tg: 15° C., molecular weight: 15000) * dimethyl ethanolamine neutralized product |
| F18 | Acrylic resin (Joncryl J-61, made by Johnson Polymer) |

TABLE 6-continued

| No. | Organic Resin |
|---|---|
| F19 | Carboxyl group-containing polyurethane resin (WS-5000, made by Mitsui Chemical, urea groups contained) |
| F20 | Carboxyl group-containing polyester resin (hydroxyl value: 10 mg KOH/g, Tg: 15° C., molecular weight: 15000) |
| F21 | Na sulfonate group-containing polyester resin (hydroxyl value: 30 mg KOH/g, Tg: 15° C., molecular weight: 15000) |
| F22 | Na sulfonate group-containing polyester resin (hydroxyl value: 35 mg KOH/g, Tg: 15° C., molecular weight: 15000) |
| F23 | Na sulfonate group-containing polyester resin (hydroxyl value: 10 mg KOH/g, Tg: 25° C., molecular weight: 15000) |
| F24 | Na sulfonate group-containing polyester resin (hydroxyl value: 10 mg KOH/g, Tg: 15° C., molecular weight: 7000) |

TABLE 7

| No. | Curing agent |
|---|---|
| G1 | Melamine resin (made by Nihon Cytec Industries, Cymel 303) |
| G2 | Melamine resin (made by Nihon Cytec Industries, Cymel 325) |
| G3 | Isocyanate compound (made by Mitsui Chemical Polyurethane, Takenate WD-725) |

TABLE 8

| No. | Carbon black |
|---|---|
| H1 | MCF#980 made by Mitsubishi Chemical (particle size 16 nm) |
| H2 | RCF#33 made by Mitsubishi Chemical (particle size 30 nm) |
| H3 | RCF#20 made by Mitsubishi Chemical (particle size 50 nm) |
| H4 | RCF#10 made by Mitsubishi Chemical (particle size 75 nm) |
| H5 | Aqua-Black ®162 made by Tokai Carbon (hydrophilically treated carbon black) |

TABLE 9

| No. | Silica |
|---|---|
| J1 | Colloidal silica (made by Nissan Chemical, Snowtex N, particle size 15 nm) |
| J2 | Colloidal silica (made by Nissan Chemical, Snowtex NS, particle size 10 nm) |
| J3 | Colloidal silica (made by Nissan Chemical, Snowtex NXS, particle size 5 nm) |
| J4 | Colloidal silica (made by Nissan Chemical, Snowtex XL, particle size 50 nm) |
| J5 | Colloidal silica (made by Nissan Chemical, Snowtex YL, particle size 65 nm) |

TABLE 10

| No. | Lubricant |
|---|---|
| K1 | Polyethylene (made by Mitsui Chemical, Chemipearl W950, particle size 0.6 μm) |
| K2 | polytetrafluoroethylene (made by Asahi Glass, AD911, particle size 0.3 μm) |
| K3 | Polyethylene (made by Mitsui Chemical, Chemipearl XWF3001, particle size 0.15 μm) |
| K4 | Polyethylene (made by Mitsui Chemical, Chemipearl W700, particle size 1.0 μm) |
| K5 | Polyethylene (made by Mitsui Chemical, Chemipearl W500, particle size 2.5 μm) |

(4) Black-Coated Metal Plate

The configuration of the coating of each black metal sheet prepared in the above (1) to (3) and the film thickness and peak sheet baking temperature of the black coating are shown in Table 11. Further, the value of X×Y found from the carbon black content (X mass %) and the film thickness of the black coating (Y μm) is also shown in Table 11. Unless otherwise indicated, the % in the table all mean mass %.

TABLE 11

| | | | Black coating (α) | | | | | | | | |
|---|---|---|---|---|---|---|---|---|---|---|---|
| | | | Polyester resin | Acrylic resin | | Polyurethane resin | | Curing agent | | | |
| | | Subbing | | *1 | *2 | *1 | *2 | *1 | *2 | | |
| No. | Metal sheet | layer (β) | Type | *1 Am't (%) | Type | Am't (%) | Am't (%) | Type | Am't (%) | Am't (%) | Type | Am't (%) | Am't (%) |
| Ex. 1 | A1 | | F1 | 80 | | | | | | | G1 | 14 | 17.4 |
| Ex. 2 | A1 | | F1 | 72 | | | | | | | G1 | 12 | 17.4 |
| Ex. 3 | A1 | | F1 | 78 | | | | | | | G1 | 13 | 17.4 |
| Ex. 4 | A1 | | F1 | 69 | | | | | | | G1 | 12 | 17.4 |
| Ex. 5 | A1 | | F1 | 69 | F18 | 0.3 | 0.4 | | | | G1 | 12 | 17.4 |
| Ex. 6 | A1 | | F1 | 69 | F18 | 0.5 | 0.7 | | | | G1 | 12 | 17.4 |
| Ex. 7 | A1 | | F1 | 67 | F18 | 2 | 3.0 | | | | G1 | 12 | 17.4 |
| Ex. 8 | A1 | | F1 | 63 | F18 | 6 | 9.5 | | | | G1 | 12 | 17.4 |
| Ex. 9 | A1 | | F1 | 61 | F18 | 8 | 13.1 | | | | G1 | 12 | 17.4 |
| Ex. 10 | A1 | | F1 | 66 | | | | F19 | 3 | 4.5 | G1 | 12 | 17.4 |
| Ex. 11 | A1 | | F1 | 65 | | | | F19 | 4 | 6.2 | G1 | 12 | 17.4 |
| Ex. 12 | A1 | | F1 | 54 | | | | F19 | 15 | 27.8 | G1 | 12 | 17.4 |
| Ex. 13 | A1 | | F1 | 35 | | | | F19 | 34 | 97.1 | G1 | 12 | 17.4 |
| Ex. 14 | A1 | | F1 | 33 | | | | F19 | 36 | 109.1 | G1 | 12 | 17.4 |
| Ex. 15 | A1 | | F1 | 52 | F18 | 2 | 3.8 | F19 | 15 | 28.8 | G1 | 12 | 17.4 |
| Ex. 16 | A1 | | F16 | 69 | | | | | | | G1 | 12 | 17.4 |
| Ex. 17 | A1 | | F16 | 67 | F18 | 2 | 3.0 | | | | G1 | 12 | 17.4 |
| Ex. 18 | A1 | | F16 | 54 | | | | F19 | 15 | 27.8 | G1 | 12 | 17.4 |
| Ex. 19 | A1 | | F16 | 52 | F18 | 2 | 3.8 | F19 | 15 | 28.8 | G1 | 12 | 17.4 |
| Ex. 20 | A1 | E1 | F1 | 67 | F18 | 2 | | | | | G1 | 12 | 17.4 |
| Ex. 21 | A1 | E2 | F1 | 67 | F18 | 2 | | | | | G1 | 12 | 17.4 |
| Ex. 22 | A1 | E3 | F1 | 67 | F18 | 2 | | | | | G1 | 12 | 17.4 |
| Ex. 23 | A1 | E4 | F1 | 67 | F18 | 2 | | | | | G1 | 12 | 17.4 |
| Ex. 24 | A1 | E5 | F1 | 67 | F18 | 2 | | | | | G1 | 12 | 17.4 |
| Ex. 25 | A1 | E6 | F1 | 67 | F18 | 2 | | | | | G1 | 12 | 17.4 |
| Ex. 26 | A1 | E7 | F1 | 67 | F18 | 2 | | | | | G1 | 12 | 17.4 |
| Ex. 27 | A1 | E8 | F1 | 67 | F18 | 2 | | | | | G1 | 12 | 17.4 |

TABLE 11-continued

| | | | | | | | | | | | |
|---|---|---|---|---|---|---|---|---|---|---|---|
| Ex. 28 | A1 | E9 | F1 | 67 | F18 | 2 | | | G1 | 12 | 17.4 |
| Ex. 29 | A1 | E4 | F2 | 67 | F18 | 2 | | | G1 | 12 | 17.4 |
| Ex. 30 | A1 | E4 | F3 | 67 | F18 | 2 | | | G1 | 12 | 17.4 |
| Ex. 31 | A1 | E4 | F4 | 67 | F18 | 2 | | | G1 | 12 | 17.4 |
| Ex. 32 | A1 | E4 | F5 | 67 | F18 | 2 | | | G1 | 12 | 17.4 |
| Ex. 33 | A1 | E4 | F6 | 67 | F18 | 2 | | | G1 | 12 | 17.4 |
| Ex. 34 | A1 | E4 | F7 | 67 | F18 | 2 | | | G1 | 12 | 17.4 |
| Ex. 35 | A1 | E4 | F8 | 67 | F18 | 2 | | | G1 | 12 | 17.4 |
| Ex. 36 | A1 | E4 | F9 | 67 | F18 | 2 | | | G1 | 12 | 17.4 |
| Ex. 37 | A1 | E4 | F10 | 67 | F18 | 2 | | | G1 | 12 | 17.4 |
| Ex. 38 | A1 | E4 | F11 | 67 | F18 | 2 | | | G1 | 12 | 17.4 |
| Ex. 39 | A1 | E4 | F12 | 67 | F18 | 2 | | | G1 | 12 | 17.4 |
| Ex. 40 | A1 | E4 | F13 | 67 | F18 | 2 | | | G1 | 12 | 17.4 |
| Ex. 41 | A1 | E4 | F14 | 67 | F18 | 2 | | | G1 | 12 | 17.4 |
| Ex. 42 | A1 | E4 | F15 | 67 | F18 | 2 | | | G1 | 12 | 17.4 |
| Ex. 43 | A1 | E4 | F16 | 67 | F18 | 2 | | | G1 | 12 | 17.4 |
| Ex. 44 | A1 | E4 | F17 | 67 | F18 | 2 | | | G1 | 12 | 17.4 |
| Ex. 45 | A1 | E4 | F1 | 67 | F18 | 2 | | | G2 | 12 | 17.4 |
| Ex. 46 | A1 | E4 | F1 | 67 | F18 | 2 | | | G3 | 12 | 17.4 |
| Ex. 47 | A1 | E4 | F1 | 76 | F18 | 2 | | | G1 | 3 | 3.8 |
| Ex. 48 | A1 | E4 | F1 | 75 | F18 | 2 | | | G1 | 4 | 5.2 |
| Ex. 49 | A1 | E4 | F1 | 71 | F18 | 2 | | | G1 | 8 | 11.0 |
| Ex. 50 | A1 | E4 | F1 | 63 | F18 | 2 | | | G1 | 16 | 24.6 |
| Ex. 51 | A1 | E4 | F1 | 59 | F18 | 2 | | | G1 | 20 | 32.8 |
| Ex. 52 | A1 | E4 | F1 | 55 | F18 | 2 | | | G1 | 24 | 42.1 |
| Ex. 53 | A1 | E4 | F1 | 67 | F18 | 2 | | | G1 | 12 | 17.4 |
| Ex. 54 | A1 | E4 | F1 | 67 | F18 | 2 | | | G1 | 12 | 17.4 |
| Ex. 55 | A1 | E4 | F1 | 67 | F18 | 2 | | | G1 | 12 | 17.4 |
| Ex. 56 | A1 | E4 | F1 | 69 | F18 | 2 | | | G1 | 12 | 17.4 |
| Ex. 57 | A1 | E4 | F1 | 68 | F18 | 2 | | | G1 | 12 | 17.4 |
| Ex. 58 | A1 | E4 | F1 | 65 | F18 | 2 | | | G1 | 12 | 17.4 |
| Ex. 59 | A1 | E4 | F1 | 64 | F18 | 2 | | | G1 | 11 | 17.4 |
| Ex. 60 | A1 | E4 | F1 | 59 | F18 | 2 | | | G1 | 11 | 17.4 |
| Ex. 61 | A1 | E4 | F1 | 58 | F18 | 2 | | | G1 | 10 | 17.4 |
| Ex. 62 | A1 | E4 | F1 | 67 | F18 | 2 | | | G1 | 12 | 17.4 |
| Ex. 63 | A1 | E4 | F1 | 73 | F18 | 2 | | | G1 | 13 | 17.4 |
| Ex. 64 | A1 | E4 | F1 | 71 | F18 | 2 | | | G1 | 13 | 17.4 |
| Ex. 65 | A1 | E4 | F1 | 58 | F18 | 2 | | | G1 | 11 | 17.4 |
| Ex. 66 | A1 | E4 | F1 | 50 | F18 | 2 | | | G1 | 9 | 17.4 |
| Ex. 67 | A1 | E4 | F1 | 46 | F18 | 2 | | | G1 | 8 | 17.4 |
| Ex. 68 | A1 | E4 | F1 | 67 | F18 | 2 | | | G1 | 12 | 17.4 |
| Ex. 69 | A1 | E4 | F1 | 69 | F18 | 2 | | | G1 | 12 | 17.4 |
| Ex. 70 | A1 | E4 | F1 | 69 | F18 | 2 | | | G1 | 12 | 17.4 |
| Ex. 71 | A1 | E4 | F1 | 64 | F18 | 2 | | | G1 | 12 | 17.4 |
| Ex. 72 | A1 | E4 | F1 | 61 | F18 | 2 | | | G1 | 11 | 17.4 |
| Ex. 73 | A1 | E4 | F1 | 59 | F18 | 2 | | | G1 | 11 | 17.4 |
| Ex. 74 | A1 | E4 | F1 | 65 | F18 | 2 | | | G1 | 12 | 17.4 |
| Ex. 75 | A1 | E4 | F1 | 64 | F18 | 2 | | | G1 | 11 | 17.4 |
| Ex. 76 | A1 | E4 | F1 | 59 | F18 | 2 | | | G1 | 11 | 17.4 |
| Ex. 77 | A1 | E4 | F1 | 58 | F18 | 2 | | | G1 | 10 | 17.4 |
| Ex. 78 | A1 | E4 | F1 | 70 | F18 | 2 | | | G1 | 12 | 17.4 |
| Ex. 79 | A1 | E4 | F1 | 69 | F18 | 2 | | | G1 | 12 | 17.4 |
| Ex. 80 | A1 | E4 | F1 | 59 | F18 | 2 | | | G1 | 11 | 17.4 |
| Ex. 81 | A1 | E4 | F1 | 58 | F18 | 2 | | | G1 | 10 | 17.4 |
| Ex. 82 | A1 | E4 | F1 | 67 | F18 | 2 | | | G1 | 12 | 17.4 |
| Ex. 83 | A1 | E4 | F1 | 67 | F18 | 2 | | | G1 | 12 | 17.4 |
| Ex. 84 | A1 | E4 | F1 | 67 | F18 | 2 | | | G1 | 12 | 17.4 |
| Ex. 85 | A1 | E4 | F1 | 67 | F18 | 2 | | | G1 | 12 | 17.4 |
| Ex. 86 | A1 | E4 | F1 | 67 | F18 | 2 | | | G1 | 12 | 17.4 |
| Ex. 87 | A1 | E4 | F1 | 67 | F18 | 2 | | | G1 | 12 | 17.4 |
| Ex. 88 | A1 | E4 | F1 | 67 | F18 | 2 | | | G1 | 12 | 17.4 |
| Ex. 89 | A1 | E4 | F1 | 67 | F18 | 2 | | | G1 | 12 | 17.4 |
| Ex. 90 | A1 | E4 | F1 | 69 | | | | | G1 | 12 | 17.4 |
| Ex. 91 | A1 | E4 | F1 | 52 | F18 | 2 | F19 | 15 | 28.8 G1 | 12 | 17.4 |
| Ex. 92 | A2 | | F1 | 67 | F18 | 2 | | | G1 | 12 | 17.4 |
| Ex. 93 | A3 | | F1 | 67 | F18 | 2 | | | G1 | 12 | 17.4 |
| Ex. 94 | A4 | | F1 | 67 | F18 | 2 | | | G1 | 12 | 17.4 |
| Ex. 95 | A5 | | F1 | 67 | F18 | 2 | | | G1 | 12 | 17.4 |
| Ex. 96 | A6 | | F1 | 67 | F18 | 2 | | | G1 | 12 | 17.4 |
| Ex. 97 | A7 | | F1 | 67 | F18 | 2 | | | G1 | 12 | 17.4 |
| Ex. 98 | A2 | E4 | F1 | 67 | F18 | 2 | | | G1 | 12 | 17.4 |
| Ex. 99 | A3 | E4 | F1 | 67 | F18 | 2 | | | G1 | 12 | 17.4 |
| Ex. 100 | A4 | E4 | F1 | 67 | F18 | 2 | | | G1 | 12 | 17.4 |
| Ex. 101 | A5 | E4 | F1 | 67 | F18 | 2 | | | G1 | 12 | 17.4 |
| Ex. 102 | A6 | E4 | F1 | 67 | F18 | 2 | | | G1 | 12 | 17.4 |
| Ex. 103 | A7 | E4 | F1 | 67 | F18 | 2 | | | G1 | 12 | 17.4 |
| Ex. 104 | A2 | E4 | F1 | 52 | F18 | 2 | F19 | 15 | 28.8 G1 | 12 | 17.4 |
| Ex. 105 | A3 | E4 | F1 | 52 | F18 | 2 | F19 | 15 | 28.8 G1 | 12 | 17.4 |
| Ex. 106 | A4 | E4 | F1 | 52 | F18 | 2 | F19 | 15 | 28.8 G1 | 12 | 17.4 |
| Ex. 107 | A5 | E4 | F1 | 52 | F18 | 2 | F19 | 15 | 28.8 G1 | 12 | 17.4 |

TABLE 11-continued

| No. | | | | | | | | | | | | |
|---|---|---|---|---|---|---|---|---|---|---|---|---|
| Ex. 108 | A6 | E4 | F1 | 52 | F18 | 2 | F19 | 15 | 28.8 | G1 | 12 | 17.4 |
| Ex. 109 | A7 | E4 | F1 | 52 | F18 | 2 | F19 | 15 | 28.8 | G1 | 12 | 17.4 |
| Ex. 110 | A1 | E4 | F2 | 67 | F18 | 2 | | | | G1 | 12 | 17.4 |
| Ex. 111 | A1 | E4 | F3 | 67 | F18 | 2 | | | | G1 | 12 | 17.4 |
| Ex. 112 | A1 | E4 | F4 | 67 | F18 | 2 | | | | G1 | 12 | 17.4 |
| Ex. 113 | A1 | E4 | F5 | 67 | F18 | 2 | | | | G1 | 12 | 17.4 |
| Ex. 114 | A1 | E4 | F21 | 67 | F18 | 2 | | | | G1 | 12 | 17.4 |
| Ex. 115 | A1 | E4 | F22 | 67 | F18 | 2 | | | | G1 | 12 | 17.4 |
| Ex. 116 | A1 | E4 | F6 | 67 | F18 | 2 | | | | G1 | 12 | 17.4 |
| Ex. 117 | A1 | E4 | F7 | 67 | F18 | 2 | | | | G1 | 12 | 17.4 |
| Ex. 118 | A1 | E4 | F23 | 67 | F18 | 2 | | | | G1 | 12 | 17.4 |
| Ex. 119 | A1 | E4 | F8 | 67 | F18 | 2 | | | | G1 | 12 | 17.4 |
| Ex. 120 | A1 | E4 | F9 | 67 | F18 | 2 | | | | G1 | 12 | 17.4 |
| Ex. 121 | A1 | E4 | F10 | 67 | F18 | 2 | | | | G1 | 12 | 17.4 |
| Ex. 122 | A1 | E4 | F24 | 67 | F18 | 2 | | | | G1 | 12 | 17.4 |
| Ex. 123 | A1 | E4 | F1 | 69 | | | | | | G1 | 12 | 17.4 |
| Ex. 124 | A1 | E4 | F1 | 67 | F18 | 2 | | | | G1 | 12 | 17.4 |
| Ex. 125 | A1 | E4 | F1 | 67 | F18 | 2 | | | | G1 | 12 | 17.4 |
| Ex. 126 | A1 | E4 | F1 | 67 | F18 | 2 | | | | G1 | 12 | 17.4 |
| Ex. 127 | A1 | E4 | F1 | 67 | F18 | 2 | | | | G1 | 12 | 17.4 |
| Ex. 128 | A1 | E4 | F1 | 67 | F18 | 2 | | | | G1 | 12 | 17.4 |
| Ex. 129 | A1 | E4 | F1 | 67 | F18 | 2 | | | | G1 | 12 | 17.4 |
| Ex. 130 | A1 | E4 | F1 | 67 | F18 | 2 | | | | G1 | 12 | 17.4 |
| Ex. 131 | A1 | E4 | F1 | 71 | F18 | 2 | | | | G1 | 12 | 17.0 |
| Ex. 132 | A1 | E4 | F1 | 70 | F18 | 2 | | | | G1 | 12 | 17.1 |
| Ex. 133 | A1 | E4 | F1 | 68 | F18 | 2 | | | | G1 | 11 | 15.2 |
| Ex. 134 | A1 | E4 | F1 | 58 | F18 | 2 | | | | G1 | 10 | 17.4 |
| Comp. ex. 1 | A1 | | F20 | 69 | | | | | | G1 | 12 | 17.4 |
| Comp. ex. 2 | A1 | E4 | F20 | 69 | | | | | | G1 | 12 | 17.4 |
| Comp. ex. 3 | A1 | | | | F18 | 69 | | | | G1 | 12 | 17.4 |
| Comp. ex. 4 | A1 | E4 | | | F18 | 69 | | | | G1 | 12 | 17.4 |
| Comp. ex. 5 | A1 | | | | | | F19 | 69 | | G1 | 12 | 17.4 |
| Comp. ex. 6 | A1 | E4 | | | | | F19 | 69 | | G1 | 12 | 17.4 |
| Comp. ex. 7 | A1 | | F1 | 69 | | | | | | | | |
| Comp. ex. 8 | A1 | E4 | F1 | 69 | | | | | | | | |
| Comp. ex. 9 | A1 | | F1 | 69 | | | | | | G1 | 12 | 17.4 |
| Comp. ex. 10 | A1 | | F1 | 69 | | | | | | G1 | 12 | 17.4 |
| Comp. ex. 11 | A1 | | F1 | 69 | F18 | 2 | | | | G1 | 12 | 16.9 |
| Comp. ex. 12 | A1 | | F1 | 69 | | | | | | G1 | 12 | 17.4 |
| Comp. ex. 13 | A1 | | F20 | 69 | | | | | | G1 | 12 | 17.4 |

| | Black coating (α) | | | | | | | | | | | |
|---|---|---|---|---|---|---|---|---|---|---|---|---|
| | Carbon black | | | Silica | | | Lubricant | | | | | |
| No. | Type | *1 X: Am't (%) | *3 Particle size (nm) | Type | *1 Am't (%) | *3 Particle size (nm) | Type | *1 Am't (%) | *3 Particle size (μm) | Y: film thick. (μm) | Peak sheet temp. (° C.) | X × Y value |
| Ex. 1 | H2 | 6 | 120 | | | | | | | 4 | 200 | 24 |
| Ex. 2 | H2 | 6 | 120 | J1 | 10 | 15 | | | | 4 | 200 | 24 |
| Ex. 3 | H2 | 6 | 120 | | | | K1 | 3 | 0.6 | 4 | 200 | 24 |
| Ex. 4 | H2 | 6 | 120 | J1 | 10 | 15 | K1 | 3 | 0.6 | 4 | 200 | 24 |
| Ex. 5 | H2 | 6 | 110 | J1 | 10 | 15 | K1 | 3 | 0.6 | 4 | 200 | 24 |
| Ex. 6 | H2 | 6 | 100 | J1 | 10 | 15 | K1 | 3 | 0.6 | 4 | 200 | 24 |
| Ex. 7 | H2 | 6 | 85 | J1 | 10 | 15 | K1 | 3 | 0.6 | 4 | 200 | 24 |
| Ex. 8 | H2 | 6 | 65 | J1 | 10 | 15 | K1 | 3 | 0.6 | 4 | 200 | 24 |
| Ex. 9 | H2 | 6 | 50 | J1 | 10 | 15 | K1 | 3 | 0.6 | 4 | 200 | 24 |
| Ex. 10 | H2 | 6 | 120 | J1 | 10 | 15 | K1 | 3 | 0.6 | 4 | 200 | 24 |
| Ex. 11 | H2 | 6 | 120 | J1 | 10 | 15 | K1 | 3 | 0.6 | 4 | 200 | 24 |
| Ex. 12 | H2 | 6 | 120 | J1 | 10 | 15 | K1 | 3 | 0.6 | 4 | 200 | 24 |
| Ex. 13 | H2 | 6 | 120 | J1 | 10 | 15 | K1 | 3 | 0.6 | 4 | 200 | 24 |
| Ex. 14 | H2 | 6 | 120 | J1 | 10 | 15 | K1 | 3 | 0.6 | 4 | 200 | 24 |
| Ex. 15 | H2 | 6 | 85 | J1 | 10 | 15 | K1 | 3 | 0.6 | 4 | 200 | 24 |
| Ex. 16 | H2 | 6 | 120 | J1 | 10 | 15 | K1 | 3 | 0.6 | 4 | 200 | 24 |
| Ex. 17 | H2 | 6 | 85 | J1 | 10 | 15 | K1 | 3 | 0.6 | 4 | 200 | 24 |
| Ex. 18 | H2 | 6 | 120 | J1 | 10 | 15 | K1 | 3 | 0.6 | 4 | 200 | 24 |
| Ex. 19 | H2 | 6 | 85 | J1 | 10 | 15 | K1 | 3 | 0.6 | 4 | 200 | 24 |
| Ex. 20 | H2 | 6 | 85 | J1 | 10 | 15 | K1 | 3 | 0.6 | 4 | 200 | 24 |
| Ex. 21 | H2 | 6 | 85 | J1 | 10 | 15 | K1 | 3 | 0.6 | 4 | 200 | 24 |
| Ex. 22 | H2 | 6 | 85 | J1 | 10 | 15 | K1 | 3 | 0.6 | 4 | 200 | 24 |
| Ex. 23 | H2 | 6 | 85 | J1 | 10 | 15 | K1 | 3 | 0.6 | 4 | 200 | 24 |
| Ex. 24 | H2 | 6 | 85 | J1 | 10 | 15 | K1 | 3 | 0.6 | 4 | 200 | 24 |
| Ex. 25 | H2 | 6 | 85 | J1 | 10 | 15 | K1 | 3 | 0.6 | 4 | 200 | 24 |
| Ex. 26 | H2 | 6 | 85 | J1 | 10 | 15 | K1 | 3 | 0.6 | 4 | 200 | 24 |
| Ex. 27 | H2 | 6 | 85 | J1 | 10 | 15 | K1 | 3 | 0.6 | 4 | 200 | 24 |
| Ex. 28 | H2 | 6 | 85 | J1 | 10 | 15 | K1 | 3 | 0.6 | 4 | 200 | 24 |
| Ex. 29 | H2 | 6 | 85 | J1 | 10 | 15 | K1 | 3 | 0.6 | 4 | 200 | 24 |
| Ex. 30 | H2 | 6 | 85 | J1 | 10 | 15 | K1 | 3 | 0.6 | 4 | 200 | 24 |

TABLE 11-continued

| | | | | | | | | | | | | |
|---|---|---|---|---|---|---|---|---|---|---|---|---|
| Ex. 31 | H2 | 6 | 85 | J1 | 10 | 15 | K1 | 3 | 0.6 | 4 | 200 | 24 |
| Ex. 32 | H2 | 6 | 85 | J1 | 10 | 15 | K1 | 3 | 0.6 | 4 | 200 | 24 |
| Ex. 33 | H2 | 6 | 85 | J1 | 10 | 15 | K1 | 3 | 0.6 | 4 | 200 | 24 |
| Ex. 34 | H2 | 6 | 85 | J1 | 10 | 15 | K1 | 3 | 0.6 | 4 | 200 | 24 |
| Ex. 35 | H2 | 6 | 85 | J1 | 10 | 15 | K1 | 3 | 0.6 | 4 | 200 | 24 |
| Ex. 36 | H2 | 6 | 85 | J1 | 10 | 15 | K1 | 3 | 0.6 | 4 | 200 | 24 |
| Ex. 37 | H2 | 6 | 85 | J1 | 10 | 15 | K1 | 3 | 0.6 | 4 | 200 | 24 |
| Ex. 38 | H2 | 6 | 85 | J1 | 10 | 15 | K1 | 3 | 0.6 | 4 | 200 | 24 |
| Ex. 39 | H2 | 6 | 85 | J1 | 10 | 15 | K1 | 3 | 0.6 | 4 | 200 | 24 |
| Ex. 40 | H2 | 6 | 85 | J1 | 10 | 15 | K1 | 3 | 0.6 | 4 | 200 | 24 |
| Ex. 41 | H2 | 6 | 85 | J1 | 10 | 15 | K1 | 3 | 0.6 | 4 | 200 | 24 |
| Ex. 42 | H2 | 6 | 85 | J1 | 10 | 15 | K1 | 3 | 0.6 | 4 | 200 | 24 |
| Ex. 43 | H2 | 6 | 85 | J1 | 10 | 15 | K1 | 3 | 0.6 | 4 | 200 | 24 |
| Ex. 44 | H2 | 6 | 120 | J1 | 10 | 15 | K1 | 3 | 0.6 | 4 | 200 | 24 |
| Ex. 45 | H2 | 6 | 85 | J1 | 10 | 15 | K1 | 3 | 0.6 | 4 | 200 | 24 |
| Ex. 46 | H2 | 6 | 85 | J1 | 10 | 15 | K1 | 3 | 0.6 | 4 | 200 | 24 |
| Ex. 47 | H2 | 6 | 85 | J1 | 10 | 15 | K1 | 3 | 0.6 | 4 | 200 | 24 |
| Ex. 48 | H2 | 6 | 85 | J1 | 10 | 15 | K1 | 3 | 0.6 | 4 | 200 | 24 |
| Ex. 49 | H2 | 6 | 85 | J1 | 10 | 15 | K1 | 3 | 0.6 | 4 | 200 | 24 |
| Ex. 50 | H2 | 6 | 85 | J1 | 10 | 15 | K1 | 3 | 0.6 | 4 | 200 | 24 |
| Ex. 51 | H2 | 6 | 85 | J1 | 10 | 15 | K1 | 3 | 0.6 | 4 | 200 | 24 |
| Ex. 52 | H2 | 6 | 85 | J1 | 10 | 15 | K1 | 3 | 0.6 | 4 | 200 | 24 |
| Ex. 53 | H1 | 6 | 70 | J1 | 10 | 15 | K1 | 3 | 0.6 | 4 | 200 | 24 |
| Ex. 54 | H3 | 6 | 100 | J1 | 10 | 15 | K1 | 3 | 0.6 | 4 | 200 | 24 |
| Ex. 55 | H4 | 6 | 150 | J1 | 10 | 15 | K1 | 3 | 0.6 | 4 | 200 | 24 |
| Ex. 56 | H2 | 4 | 85 | J1 | 10 | 15 | K1 | 3 | 0.6 | 4 | 200 | 16 |
| Ex. 57 | H2 | 5 | 85 | J1 | 10 | 15 | K1 | 3 | 0.6 | 4 | 200 | 20 |
| Ex. 58 | H2 | 8 | 85 | J1 | 10 | 15 | K1 | 3 | 0.6 | 4 | 200 | 32 |
| Ex. 59 | H2 | 10 | 85 | J1 | 10 | 15 | K1 | 3 | 0.6 | 4 | 200 | 40 |
| Ex. 60 | H2 | 15 | 85 | J1 | 10 | 15 | K1 | 3 | 0.6 | 4 | 200 | 60 |
| Ex. 61 | H2 | 17 | 85 | J1 | 10 | 15 | K1 | 3 | 0.6 | 4 | 200 | 68 |
| Ex. 62 | H2 | 6 | 85 | J2 | 10 | 10 | K1 | 3 | 0.6 | 4 | 200 | 24 |
| Ex. 63 | H2 | 6 | 85 | J1 | 3 | 15 | K1 | 3 | 0.6 | 4 | 200 | 24 |
| Ex. 64 | H2 | 6 | 85 | J1 | 5 | 15 | K1 | 3 | 0.6 | 4 | 200 | 24 |
| Ex. 65 | H2 | 6 | 85 | J1 | 20 | 15 | K1 | 3 | 0.6 | 4 | 200 | 24 |
| Ex. 66 | H2 | 6 | 85 | J1 | 30 | 15 | K1 | 3 | 0.6 | 4 | 200 | 24 |
| Ex. 67 | H2 | 6 | 85 | J1 | 35 | 15 | K1 | 3 | 0.6 | 4 | 200 | 24 |
| Ex. 68 | H2 | 6 | 85 | J1 | 10 | 15 | K2 | 3 | 0.3 | 4 | 200 | 24 |
| Ex. 69 | H2 | 6 | 85 | J1 | 10 | 15 | K1 | 0.3 | 0.6 | 4 | 200 | 24 |
| Ex. 70 | H2 | 6 | 85 | J1 | 10 | 15 | K1 | 0.5 | 0.6 | 4 | 200 | 24 |
| Ex. 71 | H2 | 6 | 85 | J1 | 10 | 15 | K1 | 6 | 0.6 | 4 | 200 | 24 |
| Ex. 72 | H2 | 6 | 85 | J1 | 10 | 15 | K1 | 10 | 0.6 | 4 | 200 | 24 |
| Ex. 73 | H2 | 6 | 85 | J1 | 10 | 15 | K1 | 12 | 0.6 | 4 | 200 | 24 |
| Ex. 74 | H2 | 8 | 85 | J1 | 10 | 15 | K1 | 3 | 0.6 | 2 | 200 | 16 |
| Ex. 75 | H2 | 10 | 85 | J1 | 10 | 15 | K1 | 3 | 0.6 | 2 | 200 | 20 |
| Ex. 76 | H2 | 15 | 85 | J1 | 10 | 15 | K1 | 3 | 0.6 | 2 | 200 | 30 |
| Ex. 77 | H2 | 17 | 85 | J1 | 10 | 15 | K1 | 3 | 0.6 | 2 | 200 | 34 |
| Ex. 78 | H2 | 3 | 85 | J1 | 10 | 15 | K1 | 3 | 0.6 | 6 | 200 | 18 |
| Ex. 79 | H2 | 4 | 85 | J1 | 10 | 15 | K1 | 3 | 0.6 | 6 | 200 | 24 |
| Ex. 80 | H2 | 15 | 85 | J1 | 10 | 15 | K1 | 3 | 0.6 | 6 | 200 | 90 |
| Ex. 81 | H2 | 17 | 85 | J1 | 10 | 15 | K1 | 3 | 0.6 | 6 | 200 | 102 |
| Ex. 82 | H2 | 6 | 85 | J1 | 10 | 15 | K1 | 3 | 0.6 | 4 | 140 | 24 |
| Ex. 83 | H2 | 6 | 85 | J1 | 10 | 15 | K1 | 3 | 0.6 | 4 | 150 | 24 |
| Ex. 84 | H2 | 6 | 85 | J1 | 10 | 15 | K1 | 3 | 0.6 | 4 | 160 | 24 |
| Ex. 85 | H2 | 6 | 85 | J1 | 10 | 15 | K1 | 3 | 0.6 | 4 | 180 | 24 |
| Ex. 86 | H2 | 6 | 85 | J1 | 10 | 15 | K1 | 3 | 0.6 | 4 | 220 | 24 |
| Ex. 87 | H2 | 6 | 85 | J1 | 10 | 15 | K1 | 3 | 0.6 | 4 | 230 | 24 |
| Ex. 88 | H2 | 6 | 85 | J1 | 10 | 15 | K1 | 3 | 0.6 | 4 | 250 | 24 |
| Ex. 89 | H2 | 6 | 85 | J1 | 10 | 15 | K1 | 3 | 0.6 | 4 | 260 | 24 |
| Ex. 90 | H2 | 6 | 120 | J1 | 10 | 15 | K1 | 3 | 0.6 | 4 | 200 | 24 |
| Ex. 91 | H2 | 6 | 85 | J1 | 10 | 15 | K1 | 3 | 0.6 | 4 | 200 | 24 |
| Ex. 92 | H2 | 6 | 85 | J1 | 10 | 15 | K1 | 3 | 0.6 | 4 | 200 | 24 |
| Ex. 93 | H2 | 6 | 85 | J1 | 10 | 15 | K1 | 3 | 0.6 | 4 | 200 | 24 |
| Ex. 94 | H2 | 6 | 85 | J1 | 10 | 15 | K1 | 3 | 0.6 | 4 | 200 | 24 |
| Ex. 95 | H2 | 6 | 85 | J1 | 10 | 15 | K1 | 3 | 0.6 | 4 | 200 | 24 |
| Ex. 96 | H2 | 6 | 85 | J1 | 10 | 15 | K1 | 3 | 0.6 | 4 | 200 | 24 |
| Ex. 97 | H2 | 6 | 85 | J1 | 10 | 15 | K1 | 3 | 0.6 | 4 | 200 | 24 |
| Ex. 98 | H2 | 6 | 85 | J1 | 10 | 15 | K1 | 3 | 0.6 | 4 | 200 | 24 |
| Ex. 99 | H2 | 6 | 85 | J1 | 10 | 15 | K1 | 3 | 0.6 | 4 | 200 | 24 |
| Ex. 100 | H2 | 6 | 85 | J1 | 10 | 15 | K1 | 3 | 0.6 | 4 | 200 | 24 |
| Ex. 101 | H2 | 6 | 85 | J1 | 10 | 15 | K1 | 3 | 0.6 | 4 | 200 | 24 |
| Ex. 102 | H2 | 6 | 85 | J1 | 10 | 15 | K1 | 3 | 0.6 | 4 | 200 | 24 |
| Ex. 103 | H2 | 6 | 85 | J1 | 10 | 15 | K1 | 3 | 0.6 | 4 | 200 | 24 |
| Ex. 104 | H2 | 6 | 85 | J1 | 10 | 15 | K1 | 3 | 0.6 | 4 | 200 | 24 |
| Ex. 105 | H2 | 6 | 85 | J1 | 10 | 15 | K1 | 3 | 0.6 | 4 | 200 | 24 |
| Ex. 106 | H2 | 6 | 85 | J1 | 10 | 15 | K1 | 3 | 0.6 | 4 | 200 | 24 |
| Ex. 107 | H2 | 6 | 85 | J1 | 10 | 15 | K1 | 3 | 0.6 | 4 | 200 | 24 |
| Ex. 108 | H2 | 6 | 85 | J1 | 10 | 15 | K1 | 3 | 0.6 | 4 | 200 | 24 |
| Ex. 109 | H2 | 6 | 85 | J1 | 10 | 15 | K1 | 3 | 0.6 | 4 | 200 | 24 |
| Ex. 110 | H2 | 6 | 85 | J1 | 10 | 15 | K1 | 3 | 0.6 | 4 | 180 | 24 |

TABLE 11-continued

| | | | | | | | | | | | | |
|---|---|---|---|---|---|---|---|---|---|---|---|---|
| Ex. 111 | H2 | 6 | 85 | J1 | 10 | 15 | K1 | 3 | 0.6 | 4 | 180 | 24 |
| Ex. 112 | H2 | 6 | 85 | J1 | 10 | 15 | K1 | 3 | 0.6 | 4 | 180 | 24 |
| Ex. 113 | H2 | 6 | 85 | J1 | 10 | 15 | K1 | 3 | 0.6 | 4 | 180 | 24 |
| Ex. 114 | H2 | 6 | 85 | J1 | 10 | 15 | K1 | 3 | 0.6 | 4 | 180 | 24 |
| Ex. 115 | H2 | 6 | 85 | J1 | 10 | 15 | K1 | 3 | 0.6 | 4 | 180 | 24 |
| Ex. 116 | H2 | 6 | 85 | J1 | 10 | 15 | K1 | 3 | 0.6 | 4 | 220 | 24 |
| Ex. 117 | H2 | 6 | 85 | J1 | 10 | 15 | K1 | 3 | 0.6 | 4 | 220 | 24 |
| Ex. 118 | H2 | 6 | 85 | J1 | 10 | 15 | K1 | 3 | 0.6 | 4 | 220 | 24 |
| Ex. 119 | H2 | 6 | 85 | J1 | 10 | 15 | K1 | 3 | 0.6 | 4 | 220 | 24 |
| Ex. 120 | H2 | 6 | 85 | J1 | 10 | 15 | K1 | 3 | 0.6 | 4 | 220 | 24 |
| Ex. 121 | H2 | 6 | 85 | J1 | 10 | 15 | K1 | 3 | 0.6 | 4 | 220 | 24 |
| Ex. 122 | H2 | 6 | 85 | J1 | 10 | 15 | K1 | 3 | 0.6 | 4 | 200 | 24 |
| Ex. 123 | H4 | 6 | 300 | J1 | 10 | 13 | K1 | 3 | 0.6 | 4 | 200 | 24 |
| Ex. 124 | H2 | 6 | 85 | J3 | 10 | 5 | K1 | 3 | 0.6 | 4 | 200 | 24 |
| Ex. 125 | H2 | 6 | 85 | J4 | 10 | 50 | K1 | 3 | 0.6 | 4 | 200 | 24 |
| Ex. 126 | H2 | 6 | 85 | J5 | 10 | 65 | K1 | 3 | 0.6 | 4 | 200 | 24 |
| Ex. 127 | H2 | 6 | 85 | J1 | 10 | 15 | K2 | 3 | 0.3 | 4 | 180 | 24 |
| Ex. 128 | H2 | 6 | 85 | J1 | 10 | 15 | K3 | 3 | 0.15 | 4 | 180 | 24 |
| Ex. 129 | H2 | 6 | 85 | J1 | 10 | 15 | K4 | 3 | 1 | 4 | 180 | 24 |
| Ex. 130 | H2 | 6 | 85 | J1 | 10 | 15 | K5 | 3 | 2.5 | 4 | 180 | 24 |
| Ex. 131 | H2 | 1.5 | 85 | J1 | 10 | 15 | K1 | 3 | 0.6 | 10 | 200 | 15 |
| Ex. 132 | H2 | 3 | 85 | J1 | 10 | 15 | K1 | 3 | 0.6 | 10 | 200 | 30 |
| Ex. 133 | H2 | 6 | 85 | J1 | 10 | 15 | K1 | 3 | 0.6 | 10 | 200 | 60 |
| Ex. 134 | H2 | 17 | 85 | J1 | 10 | 15 | K1 | 3 | 0.6 | 10 | 200 | 170 |
| Comp. ex. 1 | H2 | 6 | 350 | J1 | 10 | 15 | K1 | 3 | 0.6 | 4 | 200 | 24 |
| Comp. ex. 2 | H2 | 6 | 350 | J1 | 10 | 15 | K1 | 3 | 0.6 | 4 | 200 | 24 |
| Comp. ex. 3 | H2 | 6 | 200 | J1 | 10 | 15 | K1 | 3 | 0.6 | 4 | 200 | 24 |
| Comp. ex. 4 | H2 | 6 | 200 | J1 | 10 | 15 | K1 | 3 | 0.6 | 4 | 200 | 24 |
| Comp. ex. 5 | H2 | 6 | 320 | J1 | 10 | 15 | K1 | 3 | 0.6 | 4 | 200 | 24 |
| Comp. ex. 6 | H2 | 6 | 320 | J1 | 10 | 15 | K1 | 3 | 0.6 | 4 | 200 | 24 |
| Comp. ex. 7 | H2 | 6 | 120 | J1 | 10 | 15 | K1 | 3 | 0.6 | 4 | 200 | 24 |
| Comp. ex. 8 | H2 | 6 | 120 | J1 | 10 | 15 | K1 | 3 | 0.6 | 4 | 200 | 24 |
| Comp. ex. 9 | H2 | 6 | 120 | J1 | 10 | 15 | K1 | 3 | 0.6 | 1.5 | 200 | 9 |
| Comp. ex. 10 | H2 | 15 | 180 | J1 | 10 | 15 | K1 | 3 | 0.6 | 1.5 | 200 | 22.5 |
| Comp. ex. 11 | H2 | 6 | 85 | J1 | 10 | 15 | K1 | 3 | 0.6 | 11 | 200 | 66 |
| Comp. ex. 12 | | | | J1 | 10 | 15 | K1 | 3 | 0.6 | 4 | 200 | 0 |
| Comp. ex. 13 | H5 | 6 | 130 | J1 | 10 | 15 | K1 | 3 | 0.6 | 4 | 200 | 24 |

*1 Ratio in black coating (α),
*2 ratio with respect to polyester resin as 100%,
*3 average particle size of particles dispersed in black coating (α).

(5) Evaluation Tests

Each black-coated metal plate obtained at the above (4) (test plate) was evaluated for finish of the flat parts, moisture resistance, corrosion resistance, formability (finish of worked parts and worked part adhesion), scratch resistance, and chemical resistance by the evaluation methods and evaluation criteria shown below. The results of evaluation are shown in Table 12.

(Flat Part Finish)

A test plate was evaluated for appearance by the following evaluation criteria.

5: Black color and surface gloss both uniform. Base metal also not visible through coat at all.
4: Black color uniform, but surface gloss somewhat uneven (of level able to be somehow confirmed by closely focusing). Base metal not visible through coat at all.
3: Black color and surface gloss both somewhat uneven (of level able to be somewhat easily confirmed even closely focusing). Base metal not visible through coat at all.
2: Black color and surface gloss both uneven (of level able to be easily confirmed). Base metal not visible through coat at all.
1: Black color and surface gloss both uneven (of level able to be easily confirmed). Base metal somewhat visible through coat.

(Moisture Resistance)

A test plate was allowed to stand under conditions of a temperature of 40° C. and a humidity of 90% for 500 hours, then was evaluated for appearance by the following evaluation criteria.

5: No change at all observed in appearance
4: Gloss of surface falls extremely slightly (of level somehow discernible when arranging test plate before testing alongside).
3: Gloss of surface falls slightly (of level easily discernible when arranging test plate before testing alongside).
2: Gloss of surface falls (of level somehow discernible when just viewing test plate).
1: Gloss of surface remarkably decreases (of level easily discernible when just viewing test plate).

(Corrosion Resistance)

A test plate was sealed by tape at the end faces, then a saline spray test (SST) based on JIS Z2371 was run for 72. The state of rusting was observed and was evaluated by the following evaluation criteria.

5: No rusting
4: Rusted area of less than 1%
3: Rusted area of 1% to less than 3%
2: Rusted area of 3% to less than 5%
1: Rusted area of 5% or more (Formability (Finish of Worked Parts))

A test plate was bent 180°, then the outside of the bent part was evaluated for appearance by the following evaluation criteria. The bending was performed in a 20° C. atmosphere sandwiched 0.5 mm spacer therebetween (generally called 1T bending).

5: No cracks or other problems in coating and uniform black appearance. No fading observed either.
4: Extremely slight cracks observed in coating, some fading observed, and uniform black appearance (of level somehow discernible when arranging test plate before testing alongside).
3: Slight cracks observed in coating, some fading observed, but substantially uniform black appearance (of level easily discernible when arranging test plate before testing alongside).
2: Cracks observed in coating, and fading observed (of level somehow discernible when just viewing test plate).
1: Cracks observed in coating, and pronounced fading (of level easily discernible when just viewing test plate).

(Formability (Worked Part Adhesion))

A test plate was bent 180°, then a tape peeling test was run on the outside of the bent part. The tape peeled part was evaluated for appearance by the following evaluation criteria. Note that the bending was performed in a 20° C. atmosphere sandwiched 0.5 mm spacer therebetween (generally called 1T bending).
5: No peeling observed at coating
4: Peeling observed at very small part of coating (of extent somehow discernable when observed under jeweler's loupe)
3: Peeling observed at part of coating (of extent discernable when observed under jeweler's loupe)
2: Peeling observed at part of coating (of extent easily discernable visually)
1: Peeling observed at almost all of coating (of extent easily discernable visually)

(Scratch Resistance)

A test plate was scratched by five lines by a lead pencil at an angle of 45° and evaluated by the pencil hardness by which no scratches were formed at two lines or more. For the lead pencils, "Uni" pencils made by Mitsubishi Pencil were used. The test was conducted at 20° C. under load conditions of 4.903N (500 gf) and the sheet was evaluated by the following evaluation criteria.
5: Pencil hardness of 3H or more
4: Pencil hardness of 2H
3: Pencil hardness of H
2: Pencil hardness of F
1: Pencil hardness of HB or less (Chemical Resistance)

A test plate was set in a rubbing tester, then absorbent cotton impregnated with ethanol was rubbed back and forth 10 times by a load of 49.03 kPa (0.5 kgf/cm$^2$). The state of the coat after this was evaluated by the following evaluation criteria.
5: Rubbed surface has no tracks at all
4: Rubbed surface has very slight tracks (of level where rubbed tracks can be distinguished somehow if focusing closely).
3: Rubbed surface has slight tracks (of level where rubbed tracks can be easily distinguished if focusing closely).
2: Rubbed surface has clear tracks (of level where rubbed tracks can be instantaneously distinguished).
1: Rubbed surface has coating dissolved and Base metal exposed.

TABLE 12

| No. | Flat part finish | Moisture resistance | Corrosion resistance | Formability Worked part finish | Formability Worked part adhesion | Scratch resistance | Chemical resistance | Remarks |
|---|---|---|---|---|---|---|---|---|
| Ex. 1 | 4 | 5 | 3 | 4 | 3 | 3 | 5 | |
| Ex. 2 | 4 | 5 | 4 | 4 | 3 | 4 | 5 | |
| Ex. 3 | 4 | 5 | 3 | 4 | 3 | 4 | 5 | |
| Ex. 4 | 4 | 5 | 4 | 4 | 3 | 5 | 5 | |
| Ex. 5 | 4 | 5 | 4 | 4 | 3 | 5 | 5 | |
| Ex. 6 | 5 | 5 | 4 | 5 | 3 | 5 | 5 | |
| Ex. 7 | 5 | 5 | 4 | 5 | 3 | 5 | 5 | |
| Ex. 8 | 5 | 5 | 4 | 5 | 3 | 5 | 5 | |
| Ex. 9 | 5 | 5 | 3 | 4 | 3 | 5 | 5 | |
| Ex. 10 | 4 | 5 | 4 | 4 | 3 | 5 | 5 | |
| Ex. 11 | 4 | 5 | 5 | 4 | 4 | 5 | 5 | |
| Ex. 12 | 4 | 5 | 5 | 4 | 4 | 5 | 5 | |
| Ex. 13 | 4 | 5 | 5 | 4 | 4 | 5 | 5 | |
| Ex. 14 | 4 | 5 | 5 | 3 | 4 | 5 | 5 | |
| Ex. 15 | 5 | 5 | 5 | 5 | 4 | 5 | 5 | |
| Ex. 16 | 4 | 5 | 5 | 4 | 4 | 5 | 5 | |
| Ex. 17 | 5 | 5 | 5 | 5 | 4 | 5 | 5 | |
| Ex. 18 | 4 | 5 | 5 | 4 | 5 | 5 | 5 | |
| Ex. 19 | 5 | 5 | 5 | 5 | 5 | 5 | 5 | |
| Ex. 20 | 5 | 5 | 4 | 5 | 4 | 5 | 5 | |
| Ex. 21 | 5 | 5 | 4 | 5 | 4 | 5 | 5 | |
| Ex. 22 | 5 | 5 | 4 | 5 | 4 | 5 | 5 | |
| Ex. 23 | 5 | 5 | 4 | 5 | 5 | 5 | 5 | |
| Ex. 24 | 5 | 5 | 4 | 5 | 4 | 5 | 5 | |
| Ex. 25 | 5 | 5 | 4 | 5 | 4 | 5 | 5 | |
| Ex. 26 | 5 | 5 | 4 | 4 | 4 | 5 | 5 | |
| Ex. 27 | 5 | 5 | 4 | 5 | 5 | 5 | 5 | |
| Ex. 28 | 5 | 5 | 5 | 5 | 5 | 5 | 5 | |
| Ex. 29 | 5 | 4 | 3 | 5 | 5 | 4 | 4 | |
| Ex. 30 | 5 | 5 | 4 | 5 | 5 | 5 | 4 | |
| Ex. 31 | 5 | 5 | 4 | 5 | 5 | 5 | 5 | |
| Ex. 32 | 5 | 5 | 3 | 4 | 5 | 5 | 5 | |
| Ex. 33 | 5 | 5 | 4 | 5 | 5 | 4 | 4 | |
| Ex. 34 | 5 | 5 | 4 | 5 | 5 | 5 | 5 | |
| Ex. 35 | 5 | 5 | 4 | 5 | 5 | 5 | 5 | |
| Ex. 36 | 5 | 5 | 4 | 5 | 5 | 5 | 5 | |
| Ex. 37 | 5 | 5 | 4 | 4 | 5 | 5 | 5 | |
| Ex. 38 | 5 | 5 | 4 | 4 | 5 | 5 | 4 | |

TABLE 12-continued

| No. | Flat part finish | Moisture resistance | Corrosion resistance | Formability Worked part finish | Worked part adhesion | Scratch resistance | Chemical resistance | Remarks |
|---|---|---|---|---|---|---|---|---|
| Ex. 39 | 5 | 5 | 4 | 5 | 5 | 5 | 5 | |
| Ex. 40 | 5 | 5 | 4 | 5 | 5 | 5 | 5 | |
| Ex. 41 | 5 | 5 | 4 | 5 | 5 | 5 | 5 | |
| Ex. 42 | 5 | 5 | 4 | 5 | 5 | 5 | 5 | Paint gelling |
| Ex. 43 | 5 | 5 | 5 | 5 | 5 | 5 | 5 | |
| Ex. 44 | 4 | 5 | 4 | 5 | 4 | 5 | 5 | |
| Ex. 45 | 5 | 5 | 4 | 5 | 5 | 5 | 5 | |
| Ex. 46 | 5 | 5 | 4 | 5 | 5 | 4 | 4 | |
| Ex. 47 | 5 | 4 | 3 | 5 | 5 | 4 | 4 | |
| Ex. 48 | 5 | 5 | 4 | 5 | 5 | 4 | 4 | |
| Ex. 49 | 5 | 5 | 4 | 5 | 5 | 5 | 5 | |
| Ex. 50 | 5 | 5 | 4 | 5 | 5 | 5 | 5 | |
| Ex. 51 | 5 | 5 | 4 | 5 | 5 | 5 | 5 | |
| Ex. 52 | 5 | 5 | 3 | 4 | 5 | 5 | 5 | |
| Ex. 53 | 5 | 5 | 4 | 5 | 5 | 5 | 5 | |
| Ex. 54 | 5 | 5 | 4 | 5 | 5 | 5 | 5 | |
| Ex. 55 | 4 | 5 | 3 | 4 | 5 | 5 | 5 | |
| Ex. 56 | 3 | 5 | 4 | 3 | 5 | 5 | 5 | |
| Ex. 57 | 4 | 5 | 4 | 4 | 5 | 5 | 5 | |
| Ex. 58 | 5 | 5 | 4 | 5 | 5 | 5 | 5 | |
| Ex. 59 | 5 | 5 | 4 | 5 | 5 | 5 | 5 | |
| Ex. 60 | 5 | 5 | 4 | 5 | 4 | 5 | 5 | |
| Ex. 61 | 5 | 5 | 3 | 4 | 4 | 5 | 5 | |
| Ex. 62 | 5 | 5 | 4 | 5 | 5 | 5 | 5 | |
| Ex. 63 | 5 | 5 | 3 | 5 | 5 | 4 | 5 | |
| Ex. 64 | 5 | 5 | 4 | 5 | 5 | 5 | 5 | |
| Ex. 65 | 5 | 5 | 4 | 5 | 5 | 5 | 5 | |
| Ex. 66 | 5 | 5 | 4 | 4 | 5 | 5 | 5 | |
| Ex. 67 | 5 | 4 | 3 | 4 | 4 | 5 | 5 | |
| Ex. 68 | 5 | 5 | 4 | 5 | 5 | 5 | 5 | |
| Ex. 69 | 5 | 5 | 4 | 5 | 5 | 4 | 5 | |
| Ex. 70 | 5 | 5 | 4 | 5 | 5 | 5 | 5 | |
| Ex. 71 | 5 | 5 | 4 | 5 | 5 | 5 | 5 | |
| Ex. 72 | 5 | 5 | 4 | 5 | 5 | 5 | 5 | |
| Ex. 73 | 5 | 5 | 3 | 4 | 5 | 5 | 5 | |
| Ex. 74 | 3 | 5 | 4 | 3 | 5 | 5 | 5 | |
| Ex. 75 | 4 | 5 | 4 | 4 | 5 | 5 | 5 | |
| Ex. 76 | 5 | 5 | 4 | 5 | 4 | 5 | 5 | |
| Ex. 77 | 5 | 5 | 3 | 4 | 4 | 5 | 5 | |
| Ex. 78 | 4 | 5 | 4 | 4 | 5 | 5 | 5 | |
| Ex. 79 | 5 | 5 | 4 | 5 | 5 | 5 | 5 | |
| Ex. 80 | 5 | 5 | 4 | 5 | 4 | 5 | 5 | |
| Ex. 81 | 5 | 5 | 3 | 4 | 4 | 5 | 5 | |
| Ex. 82 | 5 | 4 | 3 | 5 | 5 | 4 | 3 | |
| Ex. 83 | 5 | 5 | 4 | 5 | 5 | 4 | 4 | |
| Ex. 84 | 5 | 5 | 4 | 5 | 5 | 5 | 4 | |
| Ex. 85 | 5 | 5 | 4 | 5 | 5 | 5 | 5 | |
| Ex. 86 | 5 | 5 | 4 | 5 | 5 | 5 | 5 | |
| Ex. 87 | 5 | 5 | 4 | 4 | 5 | 5 | 5 | |
| Ex. 88 | 5 | 5 | 3 | 4 | 5 | 5 | 5 | |
| Ex. 89 | 5 | 5 | 3 | 3 | 5 | 5 | 5 | |
| Ex. 90 | 4 | 5 | 4 | 4 | 5 | 5 | 5 | |
| Ex. 91 | 5 | 5 | 5 | 5 | 5 | 5 | 5 | |
| Ex. 92 | 5 | 5 | 4 | 4 | 3 | 5 | 5 | |
| Ex. 93 | 5 | 5 | 4 | 4 | 4 | 5 | 5 | |
| Ex. 94 | 5 | 5 | 5 | 4 | 3 | 5 | 5 | |
| Ex. 95 | 5 | 5 | 5 | 4 | 4 | 5 | 5 | |
| Ex. 96 | 5 | 5 | 5 | 4 | 3 | 5 | 5 | |
| Ex. 97 | 5 | 5 | 5 | 4 | 3 | 5 | 5 | |
| Ex. 98 | 5 | 5 | 4 | 4 | 5 | 5 | 5 | |
| Ex. 99 | 5 | 5 | 4 | 4 | 5 | 5 | 5 | |
| Ex. 100 | 5 | 5 | 5 | 4 | 5 | 5 | 5 | |
| Ex. 101 | 5 | 5 | 5 | 4 | 5 | 5 | 5 | |
| Ex. 102 | 5 | 5 | 5 | 4 | 5 | 5 | 5 | |
| Ex. 103 | 5 | 5 | 5 | 4 | 5 | 5 | 5 | |
| Ex. 104 | 5 | 5 | 5 | 4 | 5 | 5 | 5 | |
| Ex. 105 | 5 | 5 | 5 | 4 | 5 | 5 | 5 | |
| Ex. 106 | 5 | 5 | 5 | 4 | 5 | 5 | 5 | |
| Ex. 107 | 5 | 5 | 5 | 4 | 5 | 5 | 5 | |
| Ex. 108 | 5 | 5 | 5 | 4 | 5 | 5 | 5 | |
| Ex. 109 | 5 | 5 | 5 | 4 | 5 | 5 | 5 | |
| Ex. 110 | 5 | 4 | 3 | 5 | 5 | 4 | 4 | |
| Ex. 111 | 5 | 5 | 4 | 5 | 5 | 5 | 4 | |

TABLE 12-continued

| No. | Flat part finish | Moisture resistance | Corrosion resistance | Formability Worked part finish | Worked part adhesion | Scratch resistance | Chemical resistance | Remarks |
|---|---|---|---|---|---|---|---|---|
| Ex. 112 | 5 | 5 | 4 | 5 | 5 | 5 | 5 | |
| Ex. 113 | 5 | 5 | 4 | 5 | 5 | 5 | 5 | |
| Ex. 114 | 5 | 5 | 4 | 5 | 5 | 5 | 5 | |
| Ex. 115 | 5 | 5 | 3 | 4 | 5 | 5 | 5 | |
| Ex. 116 | 5 | 5 | 4 | 5 | 5 | 4 | 4 | |
| Ex. 117 | 5 | 5 | 4 | 5 | 5 | 5 | 5 | |
| Ex. 118 | 5 | 5 | 4 | 5 | 5 | 5 | 5 | |
| Ex. 119 | 5 | 5 | 4 | 4 | 5 | 5 | 5 | |
| Ex. 120 | 5 | 5 | 4 | 4 | 5 | 5 | 5 | |
| Ex. 121 | 5 | 5 | 4 | 3 | 5 | 5 | 5 | |
| Ex. 122 | 5 | 5 | 4 | 3 | 5 | 5 | 3 | |
| Ex. 123 | 3 | 5 | 3 | 3 | 5 | 5 | 5 | |
| Ex. 124 | 5 | 5 | 4 | 5 | 5 | 5 | 5 | |
| Ex. 125 | 5 | 5 | 4 | 5 | 5 | 5 | 5 | |
| Ex. 126 | 5 | 5 | 3 | 4 | 5 | 5 | 5 | |
| Ex. 127 | 5 | 5 | 4 | 5 | 5 | 4 | 5 | |
| Ex. 128 | 5 | 5 | 4 | 5 | 5 | 4 | 5 | |
| Ex. 129 | 5 | 5 | 4 | 5 | 5 | 5 | 5 | |
| Ex. 130 | 5 | 5 | 3 | 5 | 5 | 5 | 5 | |
| Ex. 131 | 4 | 5 | 4 | 4 | 5 | 5 | 5 | |
| Ex. 132 | 5 | 5 | 4 | 5 | 5 | 5 | 5 | |
| Ex. 133 | 5 | 5 | 4 | 5 | 5 | 5 | 5 | |
| Ex. 134 | 5 | 5 | 3 | 4 | 4 | 5 | 5 | |
| Comp. ex. 1 | 2 | 4 | 3 | 2 | 1 | 4 | 3 | |
| Comp. ex. 2 | 2 | 4 | 4 | 2 | 2 | 4 | 3 | |
| Comp. ex. 3 | 3 | 2 | 1 | 2 | 1 | 3 | 2 | |
| Comp. ex. 4 | 3 | 2 | 2 | 2 | 2 | 3 | 2 | |
| Comp. ex. 5 | 2 | 4 | 3 | 2 | 2 | 4 | 1 | |
| Comp. ex. 6 | 2 | 4 | 4 | 2 | 3 | 4 | 1 | |
| Comp. ex. 7 | 4 | 3 | 1 | 3 | 1 | 2 | 2 | |
| Comp. ex. 8 | 4 | 3 | 2 | 3 | 2 | 2 | 2 | |
| Comp. ex. 9 | 1 | 5 | 2 | 1 | 3 | 3 | 5 | |
| Comp. ex. 10 | 2 | 5 | 1 | 2 | 3 | 3 | 4 | |
| Comp. ex. 11 | 4 | 5 | 2 | 4 | 3 | 5 | 5 | Bubbling |
| Comp. ex. 12 | 1 | 5 | 5 | 1 | 4 | 5 | 5 | |
| Comp. ex. 13 | 4 | 2 | 2 | 4 | 3 | 5 | 4 | |

The examples of the present invention exhibited excellent flat part finish, moisture resistance, corrosion resistance, formability, scratch resistance, and chemical resistance of scores of 3 or better in all of the evaluation tests. Note that when the inventors allowed the black paints used for the examples of the present invention to stand at 40° C. for one month and investigated the storage stability, the black paint used in Example 42 gelled. That is, the black paint using the resin F15 where the molecular weight of the Na sulfonate group-containing polyester resin is 27000 is somewhat unstable in storage stability compared with other black paints.

On the other hand, the comparative examples outside the scope of the present invention, that is, Comparative Examples 1 and 2 using a polyester resin not containing sulfonic acid groups, were inferior in flat part finish and formability. Comparative Examples 3 and 4 using an acrylic resin instead of a polyester resin containing sulfonic acid groups were inferior in moisture resistance, corrosion resistance, formability, scratch resistance, and chemical resistance. Comparative Examples 5 and 6 using a polyurethane resin instead of a polyester resin containing sulfonic acid groups were inferior in flat part finish, formability, and chemical resistance. Comparative Examples 7 and 8 not using a curing agent were inferior in corrosion resistance, worked part adhesion, scratch resistance, and chemical resistance. Comparative Example 9 with a black coating of a thickness of 1.5 μm was inferior in flat part finish, corrosion resistance, and worked part finish. In Comparative Example 10 increasing the carbon black content over Comparative Example 9 as well, in the same way as Comparative Example 9, the flat part finish, corrosion resistance, and worked part finish were inferior. Comparative Example 11 with a black coating of a thickness of 11 μm had bubbles in the coating and was inferior in appearance and corrosion resistance. Comparative Example 12 not containing carbon black was not colored and was inferior in the finish of the flat parts and worked parts. Comparative Example 13 using a polyester resin not containing sulfonic acid groups and hydrophilically treated carbon black was excellent in the finish of the flat parts and worked parts, but was inferior in moisture resistance and corrosion resistance.

Above, preferred embodiments of the present invention were explained, but the present invention is not limited to these embodiments needless to say. A person skilled in the art clearly can conceive of various changes or modifications within the scope described in the claims. These naturally are also understood to fall under the technical scope of the present invention.

The invention claimed is:

1. A chromate-free black-coated metal plate characterized by comprising a metal sheet on at least one surface of which is formed a black coating (α), comprising a polyester resin (A1) containing sulfonic acid groups cured by a curing agent (B) and carbon black (C), of a thickness of 2 to 10 μm, wherein said black coating (α) is formed by coating a water-based black paint containing said polyester resin (A1) containing sulfonic acid groups, said curing agent (B), and said carbon black (C) on said metal sheet, forming a coated metal sheet, and heating the coated metal sheet to dry, characterized in that when a content of said carbon black (C) in said black coating (α) is X mass % and a thickness of said black coating (α) is Y μm, X×Y≥20 and 4≤X≤15 are satisfied,
wherein a content of the polyester resin (A1) is 33-78 mass % with respect to the mass of the black coating (α), and a content of the curing agent (B) is 5 to 35 mass % with respect to the total organic resin in the black coating (α),
wherein said black coating (α) further comprises a lubricant (E) consisting of polyethylene resin particles dispersed in said black coating (α) in the form of particles of a number average particle size of 0.15 to 1 μm,
wherein said curing agent (B) is selected from a melamine resin and/or a polyisocyanate compound, and
wherein said carbon black is selected from the group consisting of furnace black ketjen black, acetylene black, and channel black.

2. The chromate-free black-coated metal plate as set forth in claim 1, characterized in that said polyester resin (A1) has a hydroxyl value of 2 to 30 mg KOH/g.

3. The chromate-free black-coated metal plate as set forth in claim 1, characterized in that the sulfonic acid groups which are contained in said polyester resin (A1) are metal sulfonate groups neutralized by an alkali metal.

4. The chromate-free black-coated metal plate as set forth in claim 1, characterized in that said polyester resin (A1) has a glass transition temperature of 5 to 50° C.

5. The chromate-free black-coated metal plate as set forth in claim 1, characterized in that said polyester resin (A1) has a glass transition temperature of 5 to 25° C.

6. The chromate-free black-coated metal plate as set forth in claim 1, characterized in that said polyester resin (A1) has a number average molecular weight of 8000 to 25000.

7. The chromate-free black-coated metal plate as set forth in claim 1, characterized in that said polyester resin (A1) contains urethane bonds in its chemical structure.

8. The chromate-free black-coated metal plate as set forth in claim 1, characterized in that said black coating (α) further comprises an acrylic resin (A2).

9. The chromate-free black-coated metal plate as set forth in claim 1, characterized in that said curing agent (B) is the melamine resin.

10. The chromate-free black-coated metal plate as set forth in claim 1, characterized in that said carbon black (C) is dispersed in said black coating (α) in the form of particles of a number average particle size of 20 to 300 nm.

11. The chromate-free black-coated metal plate as set forth in claim 1, characterized in that said black coating (α) further comprises silica (D).

12. The chromate-free black-coated metal plate as set forth in claim 11, characterized in that said silica (D) is dispersed in said black coating (α) in the form of particles of a number average particle size of 5 to 50 nm.

13. The chromate-free black-coated metal plate as set forth in claim 1, characterized in that a subbing layer (β) is disposed under said black coating (α).

14. The chromate-free black-coated metal plate as set forth in claim 1, characterized in that said black coating (α) further comprises a polyurethane resin (A3) containing carboxyl groups.

15. The chromate-free black-coated metal plate as set forth in claim 14, characterized in that said polyurethane resin (A3) contains urea groups.

16. The chromate-free black-coated metal plate as set forth in claim 1, characterized in that said polyethylene resin particles have a number average particle size of 0.5 to 1 μm.

17. The chromate-free black-coated metal plate as set forth in claim 16, characterized in that said polyethylene resin particles have a number average particle size of 0.5 to 0.6 μm.

18. The chromate-free black-coated metal plate as set forth in claim 1, characterized in that said polyethylene resin particles have a number average particle size of 0.15 to 0.6 μm.

* * * * *